(12) United States Patent
Hwang et al.

(10) Patent No.: US 11,804,933 B2
(45) Date of Patent: *Oct. 31, 2023

(54) METHOD FOR CONFIGURING REFERENCE POINT IRRELEVANT TO COMMON RESOURCE BLOCK GRID AND APPARATUS THEREFOR

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

This patent is subject to a terminal disclaimer.

(21) Appl. No.: 17/212,539

(22) Filed: Mar. 25, 2021

(65) Prior Publication Data

US 2021/0211256 A1 Jul. 8, 2021

Related U.S. Application Data

(63) Continuation of application No. 16/869,244, filed on May 7, 2020, now Pat. No. 11,018,825, which is a
(Continued)

(30) Foreign Application Priority Data

Aug. 3, 2018 (KR) .................. 10-2018-0090691
Aug. 9, 2018 (KR) .................. 10-2018-0093032

(51) Int. Cl.
*H04W 4/00* (2018.01)
*H04L 5/00* (2006.01)
(Continued)

(52) U.S. Cl.
CPC ........... *H04L 5/0048* (2013.01); *H04W 72/23* (2023.01); *H04W 72/30* (2023.01)

(58) Field of Classification Search
CPC ............... H04L 5/0048; H04L 5/0053; H04L 5/0094; H04L 5/0051; H04L 5/0044; H04J 11/00;
(Continued)

(56) References Cited

U.S. PATENT DOCUMENTS 10,708,912 B2 7/2020 Huang et al.
10,827,487 B2 * 11/2020 Huang .............. H04W 72/0446
(Continued)

FOREIGN PATENT DOCUMENTS

EP 2615765 7/2013
JP 2017041859 2/2017
(Continued)

OTHER PUBLICATIONS

Ericsson, "Feature lead summary 3 for beam measurement and reporting," R1-1807782, 3GPP TSG-RAN WG1 Meeting #93, Busan, dated May 21-25, 2018, 42 pages.
(Continued)

*Primary Examiner* — Stephen M D Agosta
(74) *Attorney, Agent, or Firm* — Fish & Richardson P.C.

(57) ABSTRACT

Disclosed herein is a method for receiving a demodulation reference signal (DMRS) in a wireless communication system. In particular, the method may include receiving a synchronization signal/physical broadcast channel (SS/PBCH) block, acquiring information about control resource set (CORESET) #0 from a PBCH included in the SS/PBCH block, receiving a physical downlink control channel (PDCCH) through CORESET #0, and receiving a physical downlink shared channel (PDSCH) scheduled based on the PDCCH and a DMRS for the PDSCH, wherein, based on the PDCCH being addressed to a system information-radio network temporary identifier (SI-RNTI), a reference point
(Continued)

for the DMRS may be subcarrier #0 of a resource block (RB) having a lowest number among RBs included in CORESET #0.

16 Claims, 17 Drawing Sheets

Related U.S. Application Data continuation of application No. PCT/KR2019/008966, filed on Jul. 19, 2019.

(51) Int. Cl.
*H04W 72/23* (2023.01)
*H04W 72/30* (2023.01)

(58) Field of Classification Search
CPC ........... H04J 11/0069; H04J 2211/005; H04W 72/005; H04W 72/042; H04W 72/0493
See application file for complete search history.

(56) References Cited

U.S. PATENT DOCUMENTS

| | | | |
|---|---|---|---|
| 10,952,231 B2 * | 3/2021 | Liou | H04W 72/046 |
| 10,999,870 B2 * | 5/2021 | Ou | H04W 74/008 |
| 11,064,434 B2 * | 7/2021 | Lin | H04W 52/0206 |
| 2014/0204825 A1 | 7/2014 | Ekpenyong et al. | |
| 2016/0366672 A1 | 12/2016 | Papasakellariou et al. | |
| 2017/0332359 A1 | 11/2017 | Tsai et al. | |
| 2018/0192383 A1 * | 7/2018 | Nam | H04W 72/23 |
| 2018/0192404 A1 * | 7/2018 | Maaref | H04W 72/0453 |
| 2018/0227156 A1 | 8/2018 | Papasakellariou | |
| 2018/0279135 A1 * | 9/2018 | Hwang | H04W 16/28 |
| 2018/0288747 A1 | 10/2018 | Sun et al. | |
| 2018/0302889 A1 | 10/2018 | Guo et al. | |
| 2018/0324850 A1 * | 11/2018 | Amuru | H04W 74/006 |
| 2019/0020506 A1 * | 1/2019 | Cheng | H04L 1/1819 |
| 2019/0103941 A1 | 4/2019 | Seo et al. | |
| 2019/0110279 A1 | 4/2019 | Behravan et al. | |
| 2019/0158205 A1 | 5/2019 | Sheng et al. | |
| 2019/0158326 A1 | 5/2019 | Liao et al. | |
| 2019/0215807 A1 | 7/2019 | Hwang et al. | |
| 2019/0222357 A1 * | 7/2019 | Huang | H04L 5/0094 |
| 2019/0313445 A1 * | 10/2019 | Tsai | H04L 27/2666 |
| 2019/0320333 A1 | 10/2019 | Koskela et al. | |
| 2019/0342904 A1 * | 11/2019 | Islam | H04W 72/0493 |
| 2019/0342907 A1 | 11/2019 | Huang et al. | |
| 2019/0349059 A1 | 11/2019 | Wilson et al. | |
| 2019/0349149 A1 | 11/2019 | Nam et al. | |
| 2019/0357092 A1 | 11/2019 | Jung et al. | |
| 2020/0045707 A1 | 2/2020 | Hwang et al. | |
| 2020/0045708 A1 | 2/2020 | Hwang et al. | |
| 2020/0053670 A1 | 2/2020 | Jung et al. | |
| 2020/0059916 A1 | 2/2020 | Sun et al. | |
| 2020/0068591 A1 | 2/2020 | Xu | |
| 2020/0092799 A1 | 3/2020 | Xu et al. | |
| 2020/0137745 A1 | 4/2020 | Bachu et al. | |
| 2020/0145159 A1 | 5/2020 | Tsai et al. | |
| 2020/0204293 A1 | 6/2020 | Kim et al. | |
| 2020/0213065 A1 * | 7/2020 | Takeda | H04L 5/0082 |
| 2020/0213959 A1 * | 7/2020 | Liu | H04W 72/0453 |
| 2020/0221428 A1 * | 7/2020 | Moon | H04B 7/024 |
| 2020/0314881 A1 | 10/2020 | Bagheri et al. | |
| 2020/0344752 A1 * | 10/2020 | Li | H04W 72/0413 |
| 2020/0374960 A1 * | 11/2020 | Deenoo | H04W 72/1284 |
| 2021/0029657 A1 * | 1/2021 | Liu | H04L 5/1469 |
| 2021/0045141 A1 * | 2/2021 | Lee | H04W 72/1273 |
| 2021/0092622 A1 * | 3/2021 | Tiirola | H04L 1/0038 |
| 2021/0111846 A1 * | 4/2021 | Lee | H04L 5/0057 |
| 2021/0195620 A1 * | 6/2021 | Yoshimura | H04L 5/0094 |
| 2021/0204309 A1 | 7/2021 | Babaei | |
| 2021/0234659 A1 * | 7/2021 | Tang | H04L 5/0053 |
| 2021/0258200 A1 * | 8/2021 | Lee | H04L 5/0051 |
| 2021/0258936 A1 * | 8/2021 | Takeda | H04L 5/0094 |
| 2021/0274537 A1 * | 9/2021 | Lee | H04W 72/0446 |
| 2021/0321447 A1 * | 10/2021 | Lee | H04W 72/044 |
| 2021/0385826 A1 * | 12/2021 | Moon | H04L 5/0007 |
| 2022/0150929 A1 * | 5/2022 | Matsumura | H04L 5/0051 |
| 2022/0271890 A1 * | 8/2022 | Grossmann | H04W 52/242 |
| 2022/0272681 A1 * | 8/2022 | Harada | H04W 16/28 |
| 2023/0050015 A1 * | 2/2023 | Kang | H04L 5/00 |

FOREIGN PATENT DOCUMENTS

| | | |
|---|---|---|
| KR | 1020180080700 | 7/2018 |
| KR | 1020180081450 | 7/2018 |
| WO | WO2017160100 | 9/2017 |
| WO | WO2018132672 | 7/2018 |

OTHER PUBLICATIONS

JP Office Action in Japanese Appln. No. 2020-501574, dated Mar. 30, 2021, 9 pages (with English translation).
Liu et al., "Initial Access, Mobility, and User-Centric Multi-Beam Operation in 5G New Radio," Communications Magazine, IEEE, dated Mar. 2018, vol. 56, Issue 3, 7 pages.
3rd Generation Partnership Project; Technical Specification Group Radio Access Network, "NR• Physical layer procedures for data," 3GPP TS 38.214, dated Jun. 2018, 95 pages.
CATT, "Remaining issues on DMRS," R1-1801724, 3GPP TSG RAN WG1 Meeting #92, Athens, Greece, Feb. 26-Mar. 2, 2018, 21 pages.
CMCC. "Discussion on remaining issues for unicast PDCCH in CORESET#0," R1-1806361, 3GPP TSG RAN WG1 Meeting 93, Busan, Korea, May 21-25, 2018, 4 pages.
Extended European Search Report in European Appln. No. 19842741.1, dated Oct. 9, 2020, 12 pages.
LG Electronics, "Discussion on DL/UL data scheduling and HARQ procedure," R1-1808492, 3GPP TSG RAN WG1 Meeting #94, Gothenburg, Sweden, Aug. 20-24, 2018, 23 pages.
LG Electronics, "Remaining issues on Resource allocation," R1-1804558, 3GPP TSG RAN WG1 Meeting 92bis, Sanya, China, Apr. 16-20, 2018, 4 pages.
LG Electronics, "Text proposals on reference signals," R1-1810254, 3GPP TSG RAN WG1 Meeting #94bis, Chengdu, China, dated Oct. 8-12, 2018, 4 pages.
PCT International Search Report in International Application No. PCT/KR2019/008966, dated Oct. 25, 2019, 13 pages (with Partial Translation).
Vivo, "Remaining issues on PDCCH search space," R1-1803828, 3GPP TSG RAN WG1 Meeting #92bis, Sanya, China, Apr. 16-20, 2018, 6 pages.
CATT, "Remaining issues on DMRS," R1-1801724, Presented at 3GPP TSG RAN WG1 Meeting #92, Athens, Greece, Feb. 26-Mar. 2, 2018, 21 pages.
Office Action in Chinese Appln. No. 201980004545.0, dated Jan. 18, 2023, 7 pages.
Office Action in U.S. Appl. No. 17/337,021, dated Jan. 4, 2023, 18 pages.
LG Electronics, "RMSI delivery and CORESET configuration," R1-1719894, Presented at 3GPP TSG RAN WG1 Meeting #91, Reno, USA Nov. 2-Dec. 1, 2017, 16 pages.

* cited by examiner (A) CONTROL-PLANE PROTOCOL STACK (B) USER-PLANE PROTOCOL STACK

METHOD FOR CONFIGURING REFERENCE POINT IRRELEVANT TO COMMON RESOURCE BLOCK GRID AND APPARATUS THEREFOR

CROSS-REFERENCE TO RELATED APPLICATIONS

This application is a continuation of U.S. application Ser. No. 16/869,244, filed on May 7, 2020, which is a continuation of International Application No. PCT/KR2019/008966, filed on Jul. 19, 2019, which claims the benefit of Korean Application No. 10-2018-0093032, filed on Aug. 9, 2018, and Korean Application No. 10-2018-0090691, filed on Aug. 3, 2018. The disclosures of the prior applications are incorporated by reference in their entirety.

TECHNICAL FIELD

The present disclosure relates to a method for configuring a reference point irrelevant to a common resource block (RB) grid and an apparatus therefor, and more particularly, to a method for configuring, by a UE, a reference point for demodulation reference signal (DMRS) mapping and/or RB bundle without acquiring information about a common RB grid, and an apparatus therefor.

BACKGROUND 5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

SUMMARY

An object of the present disclosure is to provide a method for configuring a reference point irrelevant to a common resource block grid and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, a method for receiving a demodulation reference signal (DMRS) by a terminal in a wireless communication system may include receiving a synchronization signal/physical broadcast channel (SS/PBCH) block, acquiring information about control resource set (CORESET) #0 from a PBCH included in the SS/PBCH block, receiving a physical downlink control channel (PDCCH) through CORESET #0, and receiving a physical downlink shared channel (PDSCH) scheduled based on the PDCCH and a DMRS for the PDSCH, wherein, based on the PDCCH being addressed to a system information-radio network temporary identifier (SI-RNTI), a reference point for the DMRS may be subcarrier #0 of a resource block (RB) having a lowest number among RBs included in CORESET #0.

Herein, CORESET #0 may be configured based on a PBCH included in the SS/PBCH block.

The PDCCH may be received through search space #0 of CORESET #0.

Search space #0 may be a common search space configured based on a PBCH included in the SS/PBCH block.

The terminal may be allowed to communicate with at least one of another terminal, a network, a base station, or an autonomous vehicle.

In another aspect of the present disclosure, an apparatus for receiving a demodulation reference signal (DMRS) in a wireless communication system may include at least one processor, and at least one memory operatively coupled to the at least one processor and configured to store instructions causing, when executed, the at least one processor to perform a specific operation, wherein the specific operation may include receiving a synchronization signal/physical broadcast channel (SS/PBCH) block, acquiring information about control resource set (CORESET) #0 from a PBCH included in the SS/PBCH block, receiving a physical downlink control channel (PDCCH) through CORESET #0, and receiving a physical downlink shared channel (PDSCH) scheduled based on the PDCCH and a DMRS for the PDSCH, wherein, based on the PDCCH being addressed to a system information-radio network temporary identifier (SI-RNTI), a reference point for the DMRS may be subcarrier #0 of a resource block (RB) having a lowest number among RBs included in CORESET #0.

CORESET #0 may be configured based on a PBCH included in the SS/PBCH block.

The PDCCH may be received through search space #0 of CORESET #0.

Search space #0 may be a common search space configured based on a PBCH included in the SS/PBCH block.

The apparatus may be allowed to communicate with at least one of a terminal, a network, a base station, or an autonomous vehicle other than the apparatus.

In another aspect of the present disclosure, a terminal for receiving a demodulation reference signal (DMRS) a wireless communication system may include at least one transceiver, at least one processor, and at least one memory operatively coupled to the at least one processor and configured to store instructions causing, when executed, the at least one processor to perform a specific operation, wherein the specific operation may include receiving a synchronization signal/physical broadcast channel (SS/PBCH) block through the at least one transceiver, acquiring information about control resource set (CORESET) #0 from a PBCH included in the SS/PBCH block through the at least one transceiver, receiving, through the at least one transceiver, a physical downlink control channel (PDCCH) through CORESET #0, and receiving, through the at least one transceiver, a physical downlink shared channel (PDSCH) scheduled based on the PDCCH and a DMRS for the PDSCH, wherein, based on the PDCCH being addressed to a system information-radio network temporary identifier (SI-RNTI), a reference point for the DMRS may be subcarrier #0 of a resource block (RB) having a lowest number among RBs included in CORESET #0.

In another aspect of the present disclosure, a method for transmitting a demodulation reference signal (DMRS) by a base station in a wireless communication system may include transmitting a synchronization signal/physical broadcast channel (SS/PBCH) block including information about control resource set (CORESET) #0, transmitting a physical downlink control channel (PDCCH) through CORESET #0, and transmitting a physical downlink shared channel (PDSCH) scheduled based on the PDCCH and a DMRS for the PDSCH, wherein, based on the PDCCH being addressed to a system information-radio network temporary identifier (SI-RNTI), a reference point for the DMRS is subcarrier #0 of a resource block (RB) having a lowest number among RBs included in CORESET #0.

In another aspect of the present disclosure, a base station for transmitting a demodulation reference signal (DMRS) in a wireless communication system may include at least one transceiver, at least one processor, and at least one memory operatively coupled to the at least one processor and configured to store instructions causing, when executed, the at least one processor to perform a specific operation, wherein the specific operation may include transmitting a synchronization signal/physical broadcast channel (SS/PBCH) block including information about control resource set (CORESET) #0 through the at least one transceiver, transmitting, through the at least one transceiver, a physical downlink control channel (PDCCH) through CORESET #0, and transmitting, through the at least one transceiver, a physical downlink shared channel (PDSCH) scheduled based on the PDCCH and a DMRS for the PDSCH, wherein, based on the PDCCH being addressed to a system information-radio network temporary identifier (SI-RNTI), a reference point for the DMRS is subcarrier #0 of a resource block (RB) having a lowest number among RBs included in CORESET #0.

According to the present disclosure, a UE may efficiently utilize resources by transmitting and receiving DMRS based on a reference point other than a reference point that is based on a common resource block grid.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
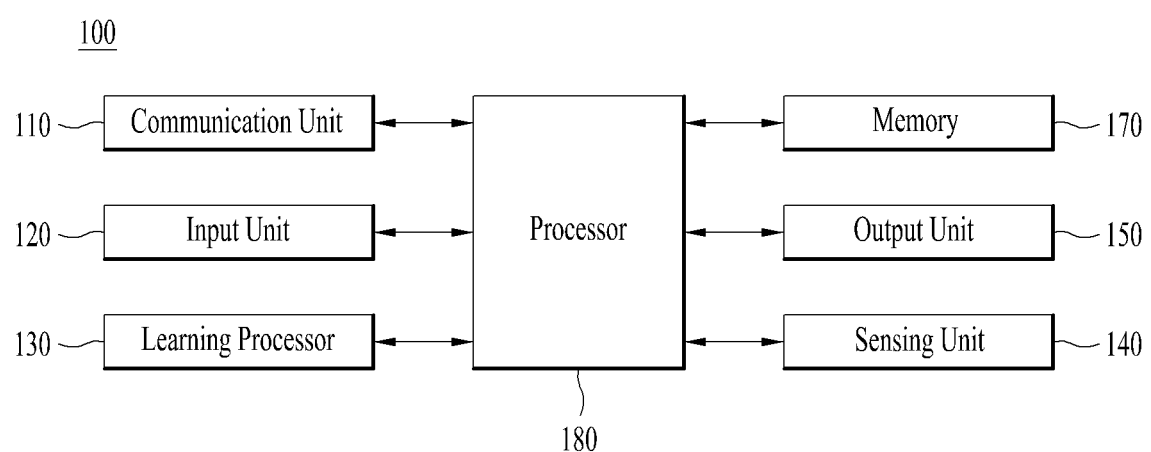
FIGS. 1 to 3 are views illustrating an artificial intelligence (AI) system and apparatus for implementing embodiments of the present disclosure.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to a field that studies AI or methodology capable of making AI. Machine learning refers to a field that defines various problems handled in the AI field and studies methodology for solving the problems. Machine learning may also be defined as an algorithm for raising performance for any task through steady experience of the task.

An artificial neural network (ANN) may refer to a model in general having problem solving capabilities, that is composed of artificial neurons (nodes) constituting a network by a combination of synapses, as a model used in machine learning. The ANN may be defined by a connection pattern between neurons of different layers, a learning process for updating model parameters, and/or an activation function for generating an output value.

The ANN may include an input layer, an output layer, and, optionally, one or more hidden layers. Each layer includes one or more neurons and the ANN may include a synapse connecting neurons. In the ANN, each neuron may output input signals, which are input through the synapse, weights, and function values of an activation function for deflection.

A model parameter refers to a parameter determined through learning and includes a weight of synaptic connection and a deflection of a neuron. A hyperparameter refers to a parameter that should be configured before learning in a machine learning algorithm and includes a learning rate, the number of repetitions, a mini batch size, an initialization function, and the like.

The purpose of learning of the ANN may be understood as determining the model parameter that minimizes a loss function. The loss function may be used as an index to determine an optimal model parameter in a learning process of the ANN.

Machine learning may be classified into supervised learning, unsupervised learning, and reinforcement learning, according to a learning scheme.

Supervised learning refers to a method of training the ANN in a state in which a label for training data is given. The label may represent a correct answer (or result value) that the ANN should infer when the training data is input to the ANN. Unsupervised learning may refer to a method of training the ANN when the label for the training data is not given. Reinforcement learning may refer to a training method in which an agent defined in a certain environment is trained to select a behavior or a behavior order that maximizes accumulative compensation in each state.

Machine learning, which is implemented as a deep neural network (DNN) including a plurality of hidden layers among ANNs, is also called deep learning. Deep learning is a part of machine learning. Hereinbelow, machine learning includes deep learning.

<Robot>

A robot may refer to a machine for automatically processing or executing a given task using capabilities possessed thereby. In particular, a robot having a function of recognizing an environment and performing self-determination and operation may be referred to as an intelligent robot A robot may be categorized into an industrial robot, a medical robot, a household robot, a military robot, etc., according to a purpose or field.

A robot may include a driving unit including an actuator or a motor to perform various physical operations such as movement of robot joints. A mobile robot may include a wheel, a brake, and a propeller in the driving unit to travel on the ground or fly.

<Self-Driving or Autonomous Driving>

Self-driving refers to technology of self-driving. A self-driving vehicle refers to a vehicle traveling without manipulation of a user or with minimum manipulation of a user.

For example, self-driving may include technology for maintaining a lane in which a vehicle is traveling, technology for automatically adjusting speed, such as adaptive cruise control, technology for autonomously traveling along a determined path, and technology for traveling by automatically setting a path if a destination is set.

A vehicle may include a vehicle having only an internal combustion engine, a hybrid vehicle having an internal combustion engine and an electric motor together, and an electric vehicle having only an electric motor and include not only an automobile but also a train, a motorcycle, and the like.

In this case, the self-driving vehicle may be understood as a robot having a self-driving function.

<Extended Reality (XR)>

XR collectively refers to virtual reality (VR), augmented reality (AR), and mixed reality (MR). VR technology provides a real-world object and a background only as computer-generated (CG) images, AR technology provides virtual CG images overlaid on actual object images, and MR technology is a computer graphic technology that mixes and combines virtual objects and the real world and then provides the mixed and combined result.

MR technology is similar to AR technology in that MR technology shows a real object and a virtual object together. However, MR technology and AR technology are different in that AR technology uses a virtual object in the form of compensating a real object, whereas MR technology uses the virtual object and the real object as an equal property.

XR technology may be applied to a head-mounted display (HMD), a head-up display (HUD), a cellular phone, a tablet PC, a laptop computer, a desktop computer, a TV, digital signage, etc. A device to which XR technology is applied may be referred to as an XR device.

FIG. 1 illustrates an AI apparatus 100 for implementing embodiments of the present disclosure.

The AI apparatus 100 may be implemented by a fixed device or a mobile device, such as a TV, a projector, a smartphone, a desktop computer, a notebook, a digital broadcast terminal, a personal digital assistant (PDA), a portable multimedia player (PMP), a navigation, a tablet PC, a wearable device, a set-top box (STB), a DMB receiver, a radio, a washing machine, a refrigerator, a desktop computer, digital signage, a robot, a vehicle, etc.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e or an AI server 200, using wired/wireless communication technology. For example, the communication unit 110 may transmit and receive sensor information, user input, a learning model, and a control signal to and from external devices.

In this case, communication technology used by the communication unit 110 includes global system for mobile communication (GSM), code-division multiple access (CDMA), long-term evolution (LTE), 5G, wireless LAN (WLAN), Wi-Fi, Bluetooth™, radio frequency identification (RFID), infrared data association (IrDA), ZigBee, near field communication (NFC), etc.

The input unit 120 may acquire a variety of types of data.

The input unit 120 may include a camera for inputting a video signal, a microphone for receiving an audio signal, and a user input unit for receiving information from a user. Herein, the camera or the microphone may be treated as a sensor and a signal obtained from the camera or the microphone may be referred to as sensing data or sensor information.

The input unit 120 may acquire training data for model learning and input data to be used upon acquiring output using a learning model. The input unit 120 may obtain raw input data. In this case, the processor 180 or the learning processor 130 may extract an input feature as preprocessing for the input data.

The learning processor 130 may train a model composed of an ANN using the training data. Herein, the trained ANN may be referred to as the learning model. The learning model may be used to infer a result value for new input data rather than training data and the inferred value may be used as a basis for determination for performing any operation.

In this case, the learning processor 130 may perform AI processing together with a learning processor 240 of the AI server 200.

The learning processor 130 may include a memory integrated or implemented in the AI apparatus 100. Alternatively, the learning processor 130 may be implemented using the memory 170, an external memory directly connected to the AI apparatus 100, or a memory maintained in an external device.

The sensing unit 140 may acquire at least one of internal information of the AI apparatus 100, surrounding environment information of the AI apparatus 100, and the user information, using various sensors.

Sensors included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, a lidar, a radar, etc.

The output unit 150 may generate output related to a visual, auditory, or tactile sense.

The output unit 150 may include a display unit for outputting visual information, a speaker for outputting auditory information, and a haptic module for outputting tactile information.

The memory 170 may store data for supporting various functions of the AI apparatus 100. For example, the memory 170 may store input data, training data, a learning model, a learning history, etc., obtained from the input unit 140a.

The processor 180 may determine at least one feasible operation of the AI apparatus 100, based on information which is determined or generated using a data analysis algorithm or a machine learning algorithm. The processor 180 may perform an operation determined by controlling constituent elements of the AI apparatus 100.

To this end, the processor 180 may request, search, receive, or use data of the learning processor 130 or the memory 170 and control the constituent elements of the AI apparatus 100 to perform a predicted operation among the at least one feasible operation, or an operation determined to be desirable.

If the processor 180 needs to be associated with an external device in order to perform the determined operation, the processor 180 may generate a control signal for controlling the external device and transmit the generated control signal to the external device.

The processor 180 may obtain intention information for user input and determine requirements of the user based on the acquired intention information.

The processor 180 may acquire the intention information corresponding to user input, using at least one of a speech-to-text (STT) engine for converting audio input into a text stream or a natural language processing (NLP) engine for obtaining intention information of a natural language.

At least a part of at least one of the STT engine or the NLP engine may be composed of an ANN trained according to a machine learning algorithm. At least one of the STT engine or the NLP engine may be trained by the learning processor 130, a learning processor 240 of the AI server 200, or by distribution processing of the learning processors 130 and 240.

The processor 180 may collect history information including the operation contents of the AI apparatus 100 or feedback for operation by a user and store the collected information in the memory unit 170 or the learning processor unit 130 or transmit the collected information to an external device such as the AI server 200. The collected history information may be used to update a learning model.

The processor 180 may control at least a part of the constituent elements of the AI apparatus 100 in order to drive an application program stored in the memory 170. Further, the processor 180 may operate by combining two or more of the constituent elements included in the AI apparatus 100 in order to drive the application program.

Figure 2:
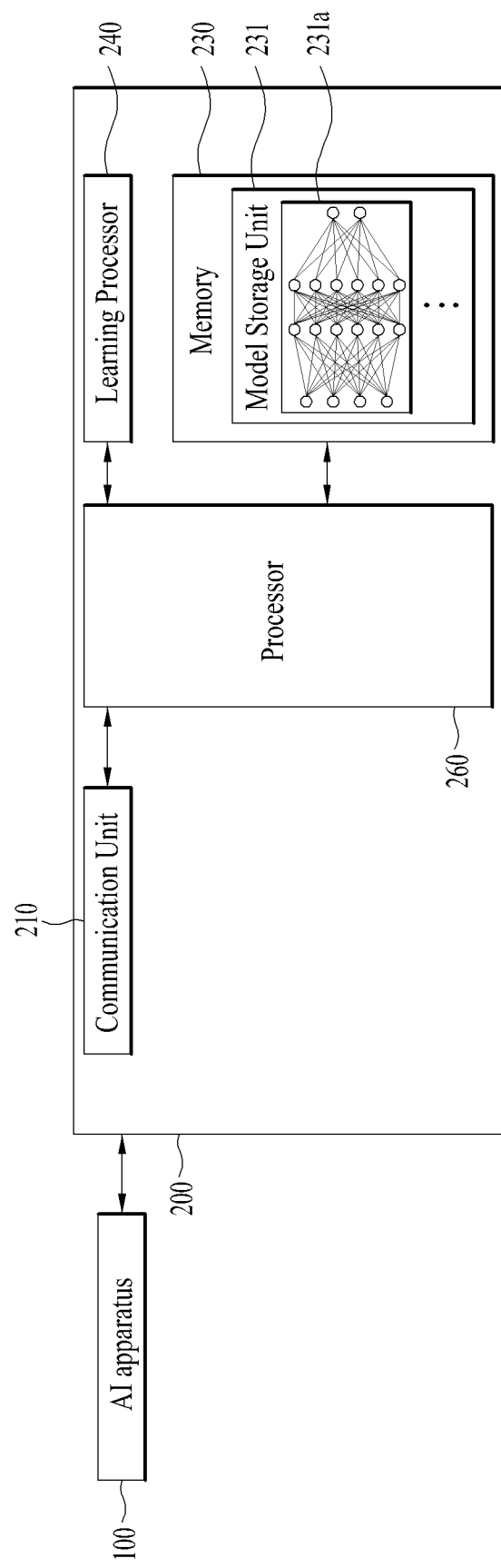

FIG. 2 illustrates an AI server 200 for implementing embodiments of the present disclosure.

Referring to FIG. 2, the AI server 200 may refer to a device that trains an ANN using a machine learning algorithm or uses the trained ANN. The AI server 200 may be composed of a plurality of servers to perform distributed processing or may be defined as a 5G network. The AI server 200 may be included as a partial constituent element of the AI apparatus 100 and may perform at least a part of AI processing together with the AI apparatus 100.

The AI server 200 may include a communication unit 210, a memory 230, a learning processor 240, and a processor 260.

The communication unit 210 may transmit and receive data to and from an external device such as the AI apparatus 100.

The memory 230 may include a model storage unit 231. The model storage unit 231 may store a model, which is training or is trained, (or an ANN 231a) through the learning processor 240.

The learning processor 240 may train the ANN 231a using training data. A learning model may be used in a state in which the ANN is mounted in the AI server 200 or the ANN is mounted in an external device such as the AI apparatus 100.

The learning model may be implemented by hardware, software, or a combination of hardware and software. If the learning model is fully or partially implemented by software, one or more instructions constituting the learning model may be stored in memory 230.

The processor 260 may infer a result value for new input data using the learning model and generate a response or control command based on the inferred result value.

Figure 3:
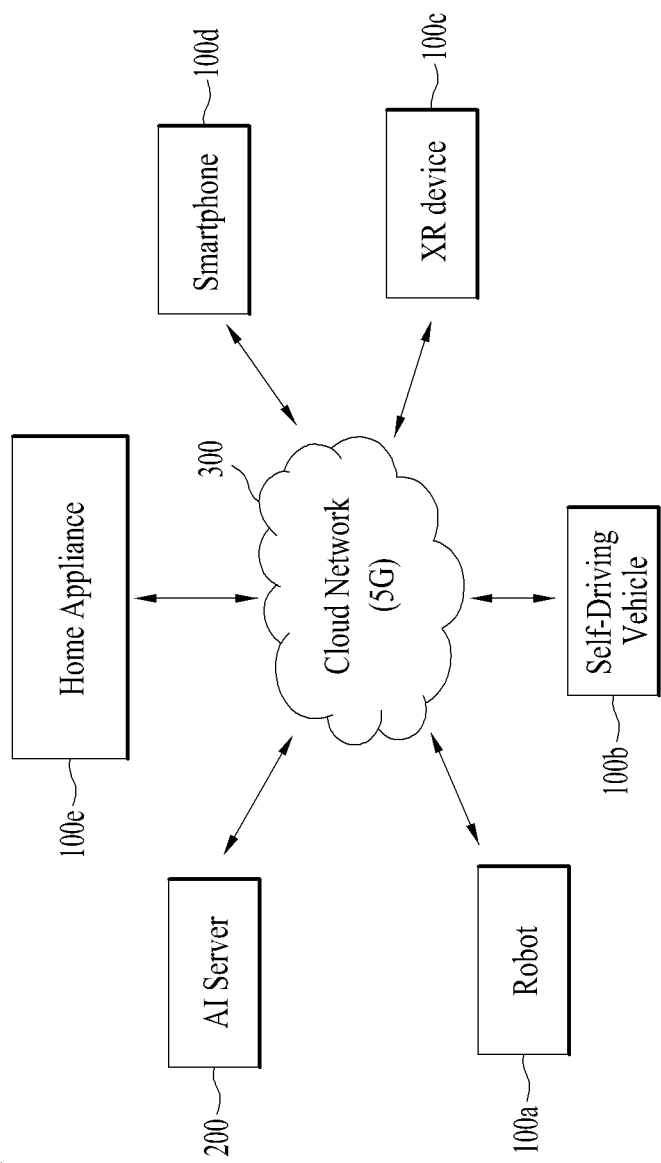

FIG. 3 illustrates an AI system 1 for implementing embodiments of the present disclosure.

Referring to FIG. 3, at least one of an AI server 200, a robot 100a, a self-driving vehicle 100b, an XR device 100c, a smartphone 100d, or a home appliance 100e, constituting the AI system 1, is connected to a cloud network 10. The robot 100a, the self-driving vehicle 100b, the XR device 100c, the smartphone 100d, and the home appliance 100e to which AI technology is applied may be referred to as AI apparatuses 100a to 100e.

The cloud network 10 may refer to a network that constitutes a part of cloud computing infrastructure or is present in the cloud computing infrastructure. The cloud network 10 may be configured using a 3G network, a 4G or LTE network, or a 5G network.

That is, each of the apparatuses 100a to 100e and 200 that constitute the AI system 1 may be connected to each other through the cloud network 10. Particularly, the apparatuses 100a through 100e and 200 may communicate with each other through an eNB but may directly communicate with each other without passing through the eNB.

The AI server 200 may include a server for performing AI processing and a server for performing operation upon big data.

The AI server 200 is connected through the cloud network 10 to at least one of the robot 100a, the self-driving vehicle 100b, the XR device 100c, the smartphone 100d, or the home appliance 100e, which are AI apparatuses constituting the AI system 1, and may aid in at least a part of AI processing of the connected AI apparatuses 100a to 100e.

The AI server 200 may train the ANN according to the machine learning algorithm on behalf of the AI apparatuses 100a to 100e and may directly store a learning model or transmit the learning model to the AI apparatuses 100a to 100e.

The AI server 200 may receive input data from the AI apparatuses 100a to 100e, infer a result value for the input data received using the learning model, generate a response or a control command based on the inferred result value, and transmit the response or the control command to the AI apparatuses 100a to 100e.

Alternatively, the AI apparatuses 100a to 100e may infer the result value for input data using a direct learning model and generate the response or the control command based on the inferred result value.

Hereinafter, various embodiments of the AI apparatuses 100a to 100e to which the above-described techniques are applied will be described. The AI apparatuses 100a to 100e illustrated in FIG. 3 may be a specific embodiment of the AI apparatus 100 illustrated in FIG. 1.

<AI+Robot>

The robot 100a to which AI technology is applied may be implemented as a guide robot, a delivery robot, a cleaning robot, a wearable robot, an entertainment robot, a pet robot, an unmanned aerial robot, etc.

The robot 100a may include a robot control module for controlling operation. The robot control module may refer to a software module or a chip implementing the software module as hardware.

The robot 100a may acquire state information of the robot 100a using sensor information obtained from various types of sensors, detect (recognize) a surrounding environment and an object, generate map data, determine a moving path and a traveling plan, determine a response to user interaction, or determine operation.

To determine the moving path and traveling plan, the robot 100a may use the sensor information obtained from at least one sensor of a lidar, a radar, or a camera.

The robot 100a may perform the above-described operations using a learning model composed of at least one ANN. For example, the robot 100a may recognize the surrounding environment and the object using the learning model and determine operation using information about the recognized surrounding or information about the recognized object. The learning model may be trained directly from the robot 100a or trained from an external device such as the AI server 200.

Although the robot 100a generates a result using the direct learning model and performs operation, the robot 100a may transmit the sensor information to an external device such as the AI server 200 and receives a generated result to perform operation.

The robot 100a may determine the moving path and the traveling plan using at least one of the map data, object information detected from the sensor information, or object information acquired from an external device and control a driving unit so that the robot 100a may travel according to the determined moving path and traveling plan.

The map data may include object identification information regarding various objects arranged in a space in which the robot 100a moves. For example, the map data may include the object identification information regarding fixed objects such as walls or doors and mobile objects such as flower pots or desks. The object identification information may include a name, a type, a distance, and a position.

In addition, the robot 100a may perform operation or travel by controlling the driving unit based on control/interaction of the user. In this case, the robot 100a may acquire intention information of interaction caused by actions or voice utterance of the user, determine a response based on the acquired intention information, and perform operation.

<AI+Self-Driving>

The self-driving vehicle 100b to which AI technology is applied may be implemented as a mobile robot, a car, or an unmanned aerial vehicle.

The self-driving vehicle 100b may include a self-driving control module for a self-driving function. The self-driving control module may refer to a software module or a chip implementing the software module as hardware. Although the self-driving control module may be included in the self-driving vehicle 100b as a constituent element of the self-driving vehicle 100b, the self-driving control module may be configured as separate hardware and connected to the exterior of the self-driving vehicle 100b.

The self-driving vehicle 100b may acquire state information thereof using sensor information obtained from various types of sensors, detect (recognize) a surrounding environment and an object, generate map data, determine a moving path and a traveling plan, or determine operation.

To determine the moving path and traveling plan, the self-driving vehicle 100b may use the sensor information obtained from at least one sensor of a lidar, a radar, or a camera as in the robot 100a.

Particularly, the self-driving vehicle 100b may recognize an environment or an object for a region in which user view is blocked or a region separated from the user by a predetermined distance or more by receiving sensor information from external devices or receiving information directly recognized from external devices.

The self-driving vehicle 100b may perform the above-described operations using a learning model composed of at least one ANN. For example, the self-driving vehicle 100b may recognize a surrounding environment and an object using the learning model and determine a moving line for traveling using information about the recognized surrounding or information about the recognized object. The learning model may be trained directly from the self-driving vehicle 100b or trained from an external device such as the AI server 200.

Although the self-driving vehicle 100b generates a result using the direct learning model and performs operation, the self-driving vehicle 100b may transmit the sensor information to an external device such as the AI server 200 and receive a generated result to perform operation.

The self-driving vehicle 100b may determine a moving path and a traveling plan using at least one of object information detected from map data or sensor information or object information acquired from an external device and control a driving unit so that the self-driving vehicle 100b may travel according to the determined moving path and traveling plan The map data may include object identification information regarding various objects arranged in a space (e.g., a road) in which the self-driving vehicle 100b travels. For example, the map data may include the object identification information regarding fixed objects such as street lights, rocks, or buildings and mobile objects such as mobile objects such as vehicles or pedestrians. The object identification information may include a name, a type, a distance, and a position.

In addition, the self-driving vehicle 100b may perform operation or travel by controlling the driving unit based on control/interaction of the user. In this case, the self-driving vehicle 100b may acquire intention information of interaction caused by actions or voice utterance of the user, determine a response based on the acquired intention information, and perform operation.

<AI+XR>

The XR device 100c to which AI technology is applied may be implemented as a head-mounted display (HMD), a head-up display (HUD) mounted in a vehicle, a television, a smartphone, a computer, a wearable device, a home appliance, digital signage, a vehicle, a fixed or mobile robot, etc.

The XR device 100c acquires information about a surrounding space or a real object by analyzing three-dimensional (3D) point cloud data or image data, obtained through various sensors or from an external device, and generating position data and attribute data, for 3D points, render an XR object to be output, and output the rendered XR object. For example, the XR device 100c may map an XR object including additional information for a recognized object to the recognized object and output the XR object.

The XR device 100c may perform the above-described operations using a learning model composed of at least one ANN. For example, the XR device 100c may recognize a real object from 3D point cloud data or image data using the learning model and provide information corresponding to the recognized real object. The learning model may be trained directly from the XR device 100c or trained from an external device such as the AI server 200.

Although the XR device 100c generates a result using the direct learning model and performs operation, the XR device 100 may transmit the sensor information to an external device such as the AI server 200 and receive a generated result to perform operation.

<AI+Robot+Self-Driving>

The robot 100a to which AI technology is applied may be implemented as a guide robot, a delivery robot, a cleaning robot, a wearable robot, an entertainment robot, a pet robot, or an unmanned aerial robot.

The robot 100a to which AI technology and self-driving technology are applied may refer to a robot itself having a self-driving function or a robot 100a interacting with the self-driving vehicle 100b.

To robot 100a having the self-driving function may collectively refer to devices that move autonomously along a given moving line without user intervention or determine by itself a moving path and move.

The robot 100a and the self-driving vehicle 100b having the self-driving function may use a common sensing method to determine at least one of a moving path or a traveling plan. For example, the robot 100a having the self-driving function and the self-driving vehicle 100b may determine at least one of the moving path or the traveling plan using information sensed through a lidar, a radar, and a camera.

The robot 100a that interacts with the self-driving vehicle 100b may be present separately from the self-driving vehicle 100b so that the robot 100a may be associated with the self-driving function at the interior or exterior of the self-driving vehicle 100b or may perform operation in association with a user riding in the self-driving vehicle 100b.

The robot 100a that interacts with the self-driving vehicle 100b may control or assist the self-driving function of the self-driving vehicle 100b by acquiring sensor information on behalf of the self-driving vehicle 100b and providing the sensor information to the self-driving vehicle 100b or by acquiring the sensor information, generating surrounding environment information or object information, and providing the generated surrounding environment information or object information to the self-driving vehicle 100b.

Alternatively, the robot 100a interacting with the self-driving vehicle 100b may control the self-driving function of the self-driving vehicle 100b by monitoring a user riding in the self-driving vehicle 100b or interacting with the user. For example, when it is determined that the driver is in a drowsy state, the robot 100a may activate the self-driving function of the self-driving vehicle 100b or assist control of the driving unit of the self-driving vehicle 100b. The function of the self-driving vehicle 100b controlled by the robot 100a may include not only the self-driving function but also a function provided by a navigation system or an audio system installed in the self-driving vehicle 100b.

Alternatively, the robot 100a interacting with the self-driving vehicle 100b may provide information to the self-driving vehicle 100b or assist the function of the self-driving vehicle 100b, at the exterior of the self-driving vehicle 100b. For example, the robot 100a may provide traffic information including signal information, such as a smart signal light, to the self-driving vehicle 100b or may interact with the self-driving vehicle 100b to automatically connect an automatic electric charger of an electric vehicle to an inlet.

<AI+Robot+XR>

The robot 100a to which AI technology is applied may be implemented as a guide robot, a delivery robot, a cleaning robot, a wearable robot, an entertainment robot, a pet robot, an unmanned aerial robot, a drone, etc.

The robot 100a to which XR technology is applied may refer to a robot with which control/interaction is performed in the XR image. In this case, the robot 100a may be distinguished from the XR device 100c and may be interlocked with the XR device 100c.

When the robot 100a with which control/interaction is performed in the XR image acquires sensor information from sensors including a camera, the robot 100a or the XR device 100c may generate the XR image based on the sensor information and the XR device 100c may output the generated XR image. The robot 100a may operate based on a control signal input through the XR device 100c or on interaction with the user.

For example, the user may confirm an XR image corresponding to a viewpoint of the robot 100a linked remotely through an external device such as the XR device 100c, control a self-driving path of the robot 100a through interaction, control operation or traveling, or confirm information of a surrounding object.

<AI+Self-Driving+XR>

The self-driving vehicle 100b to which AI technology and XR technology are applied may be implemented as a mobile robot, a vehicle, or an unmanned aerial vehicle.

The self-driving vehicle 100b to which XR technology is applied may refer to a self-driving vehicle having a means for providing an XR image or a self-driving vehicle with which control/interaction is performed in the XR image. Particularly, the self-driving vehicle 100b to be controlled/ interacted with in the XR image may be distinguished from the XR device 100*c* and interlocked with the XR device 100*c*.

The self-driving vehicle 100*b* having the means for providing the XR image may obtain sensor information from sensors including a camera and output the XR image generated based on the obtained sensor information. For example, the self-driving vehicle 100*b* may include a HUD therein to output the XR image, thereby providing a real object or an XR object corresponding to an object in a screen to a rider.

If the XR object is output to the HUD, at least a part of the XR object may be output so as to overlap with an actual object towards which the rider gazes is directed. On the other hand, if the XR object is output to a display mounted in the self-driving vehicle 100*b*, at least a part of the XR object may be output so as to overlap with an object on the screen. For example, the self-driving vehicle 100*b* may output XR objects corresponding to objects such as a lane, other vehicles, traffic lights, traffic signs, two-wheeled vehicles, pedestrians, buildings, etc.

If the self-driving vehicle 100*b* with which control/interaction is performed in the XR image acquires the sensor information from sensors including a camera, the self-driving vehicle 100*b* or the XR device 100*c* may generate an XR image based on the sensor information and the XR device 100*c* may output the generated XR image. The self-driving vehicle 100*b* may operate based on a control signal input from an external device such as the XR device 100*c* or on interaction with the user.

Figure 4:
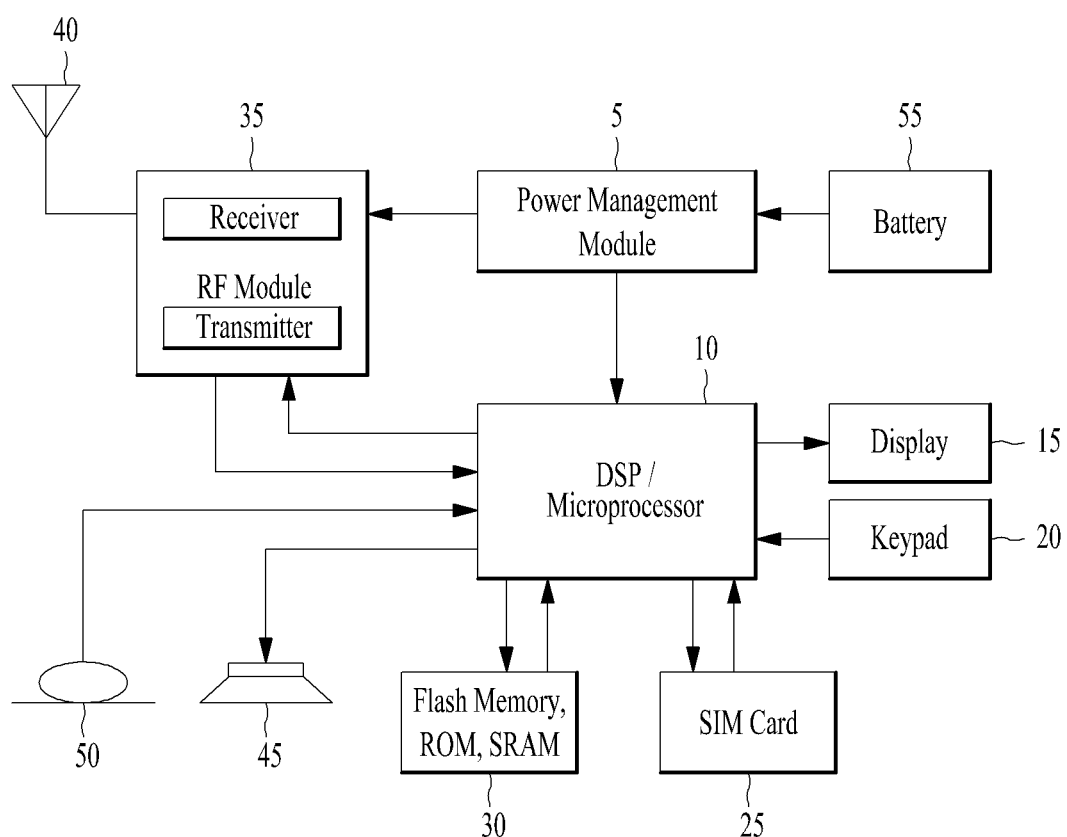
FIG. 4 is a block diagram illustrating components of a wireless communication apparatus for implementing the present disclosure.

FIG. 4 shows an example of a wireless communication apparatus according to an implementation of the present disclosure.

The wireless communication apparatus illustrated in FIG. 4 may represent a UE and/or a base station according to an implementation of the present disclosure. However, the wireless communication apparatus of FIG. 4 is not necessarily limited to the UE and/or the base station according to the present disclosure, and may implement various types of apparatuses, such as a vehicle communication system or apparatus, a wearable apparatus, a laptop, etc. More specifically, the apparatus may be any of a base station, a network node, a transmitting UE, a receiving UE, a wireless apparatus, a wireless communication apparatus, a vehicle, a vehicle equipped with an autonomous driving function, an unmanned aerial vehicle (UAV), an artificial intelligence (AI) module, a robot, an augmented reality (AR) device, a virtual reality (VR) device, an MTC device, an IoT device, medical equipment, a FinTech device (or financial device), a security device, a weather/environmental device, and a device related to fourth industrial revolution fields or 5G services. For example, a UAV may be an unmanned aircraft flying according to a wireless control signal. For example, an MTC device and an IoT device do not need direct human intervention or manipulation, including a smart meter, a vending machine, a thermometer, a smart bulb, a door lock, and various sensors. For example, medical equipment refers to a device designed to diagnose, remedy, alleviate, treat, or prevent diseases or a device that examines, replaces or modifies a structure or function, including diagnosis equipment, a surgery device, a vitro diagnostic kit, a hearing aid, and a procedure device. For example, a security device is installed to prevent probable dangers and maintain safety, including a camera, a closed-circuit television (CCTV), and a black box. For example, the FinTech device is a device that provides financial services such as mobile payment. For example, a weather/environmental device may refer to a device that monitors and predicts weather/environment.

Further, a transmitting UE and a receiving UE may include a portable phone, a smartphone, a laptop computer, a digital broadcasting terminal, a personal digital assistant (PDA), a portable multimedia player (PMP), a navigator, a slate personal computer (PC), a tablet PC, an ultrabook, a wearable device (e.g., a smart watch, smart glasses, a head-mounted display (HMD)), and a foldable device. For example, an HMD is a display device wearable on the head, which may be used to implement VR or AR.

In the example of FIG. 4, a UE and/or a base station according to an implementation of the present disclosure includes at least one processor 10 such as a digital signal processor or a microprocessor, a transceiver 35, a power management module 5, an antenna 40, a battery 55, a display 15, a keypad 20, at least one memory 30, a subscriber identity module (SIM) card 25, a speaker 45, and a microphone 50, and the like. In addition, the UE and/or the base station may include a single antenna or multiple antennas. The transceiver 35 may be also referred to as an RF module.

The at least one processor 10 may be configured to implement the functions, procedures and/or methods described in FIGS. 5 to 17. In at least some of the implementations described in FIGS. 5 to 17, the at least one processor 10 may implement one or more protocols, such as layers of the air interface protocol (e.g., functional layers).

The at least one memory 30 is connected to the at least one processor 10 and stores information related to the operation of the at least one processor 10. The at least one memory 30 may be internal or external to the at least one processor 10 and may be coupled to the at least one processor 10 via a variety of techniques, such as wired or wireless communication.

The user can input various types of information (for example, instruction information such as a telephone number) by various techniques such as pressing a button on the keypad 20 or activating a voice using the microphone 50. The at least one processor 10 performs appropriate functions such as receiving and/or processing information of the user and dialing a telephone number.

It is also possible to retrieve data (e.g., operational data) from the SIM card 25 or the at least one memory 30 to perform the appropriate functions. In addition, the at least one processor 10 may receive and process GPS information from the GPS chip to obtain location information of the UE and/or base station such as vehicle navigation, map service, or the like, or perform functions related to location information. In addition, the at least one processor 10 may display these various types of information and data on the display 15 for reference and convenience of the user.

The transceiver 35 is coupled to the at least one processor 10 to transmit and/or receive radio signals, such as RF signals. At this time, the at least one processor 10 may control the transceiver 35 to initiate communications and transmit wireless signals including various types of information or data, such as voice communication data. The transceiver 35 may comprise a receiver for receiving the radio signal and a transmitter for transmitting. The antenna 40 facilitates the transmission and reception of radio signals. In some implementations, upon receipt of a radio signal, the transceiver 35 may forward and convert the signal to a baseband frequency for processing by the at least one processor 10. The processed signals may be processed according to various techniques, such as being converted into audible or readable information, and such signals may be output via the speaker 45.

In some implementations, a sensor may also be coupled to the at least one processor 10. The sensor may include one or more sensing devices configured to detect various types of information, including velocity, acceleration, light, vibration, and the like. The at least one processor 10 receives and processes the sensor information obtained from the sensor such as proximity, position, image, and the like, thereby performing various functions such as collision avoidance and autonomous travel.

Meanwhile, various components such as a camera, a USB port, and the like may be further included in the UE and/or the base station. For example, a camera may be further connected to the at least one processor 10, which may be used for a variety of services such as autonomous navigation, vehicle safety services, and the like.

Figure 12:
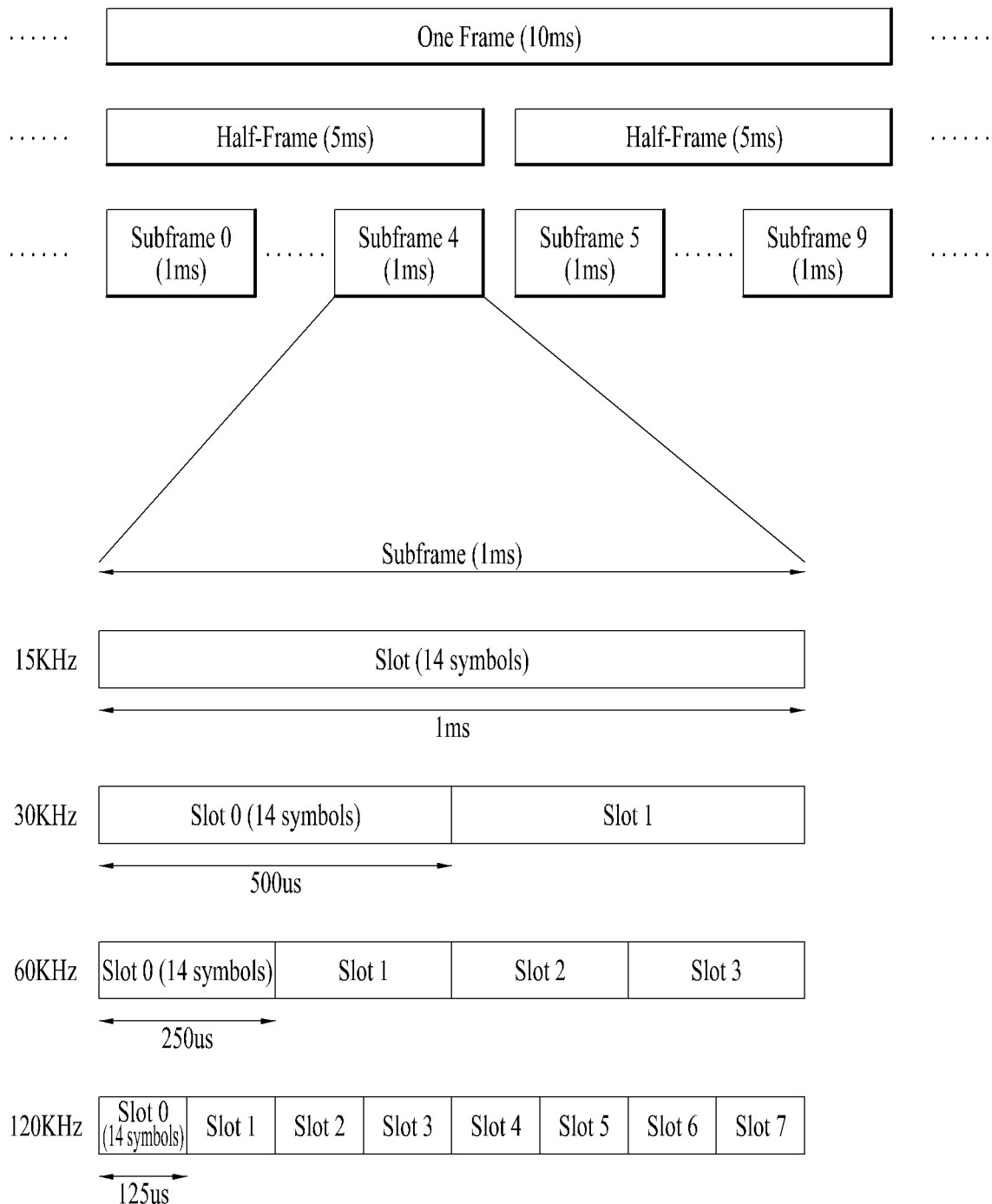
FIGS. 12 to 14 are views illustrating structures of a radio frame and slots used in a new RAT (NR) system.

FIG. 12 merely illustrates one example of an apparatuses constituting the UE and/or the base station, and the present disclosure is not limited thereto. For example, some components, such as keypad 20, Global Positioning System (GPS) chip, sensor, speaker 45 and/or microphone 50 may be excluded for UE and/or base station implementations in some implementations.

Specifically, an operation performed to implement embodiments of the present disclosure in a case where the wireless communication device illustrated in FIG. 4 is a UE according to an example of the present disclosure will be discussed. When the wireless communication device is a UE according to an example of the present disclosure, the processor 10 may control the transceiver 35 to receive a synchronization signal/physical broadcast channel (SS/PBCH) block, and acquire information about a control resource set (CORESET) for a physical downlink control channel (PDCCH) for scheduling of a physical downlink shared channel (PDSCH) from a master information block (MIB) included in a PBCH of the SS/PBCH block.

Then, the processor 10 may control the transceiver 35 to receive a PDCCH and a demodulation reference signal (DMRS) through a search space of the CORESET based on a first default mode. In this case, the method and condition for receiving the DMRS based on the first default mode may be based on conditions 1-1 and 1-2, which will be described later.

The processor 10 may control the transceiver 35 to receive a PDSCH carrying system information block 1 (SIB 1) and a DMRS for the PDSCH based on a second default mode according to scheduling information about the PDSCH acquired from the received PDCCH. In this case, the method and condition for receiving the DMRS based on the second default mode may be based on conditions 2-1 to 2-2, which will be described later.

In addition, the processor 10 may acquire initial BWP (Bandwidth Part) information through the SIB1 for the UE having received the SIB1, and control the transceiver 35 to receive downlink control information (DCI) including group TPC information based on the initial BWP information. In this case, the method for generating the DCI including the group TPC information and the method for transmitting/receiving the same may be based on Methods 1-1 to 1-3 and Methods 2-1 and 2-2, which will be described later.

In order to implement embodiments of the present disclosure, when the wireless communication device illustrated in FIG. 12 is a BS according to an example of the present disclosure, the processor 10 may control the transceiver 35 to transmit an SS/PBCH block. In addition, the processor 10 may control the transceiver 35 to transmit a PDCCH and a DMRS for the PDCCH based on the first default mode according to the information about the CORESET transmitted through the MIB included in the PBCH of the SS/PBCH block. In this case, the method and condition for generating and transmitting the DMRS based on the first default mode may be based on conditions 1-1 and 1-2, which are described later.

In addition, the processor 10 may control the transceiver 35 to transmit the PDSCH carrying SIB1 and the DMRS for the PDSCH based on the second default mode according to the scheduling information included in the PDCCH. In this case, the method and condition for generating and transmitting the DMRS based on the second default mode may be based on conditions 2-1 to 2-2, which will be described later.

The processor 10 having transmitted SIB1 may control the transceiver 35 to transmit initial BWP information through SIB1, and control the transceiver 35 to transmit DCI including group TPC information based on the initial BWP information. In this case, the method for generating and transmitting/receiving the DCI including the group TPC information may also be based on Methods 1-1 to 1-3 and Methods 2-1 and 2-2, which will be described later.

Figure 5:
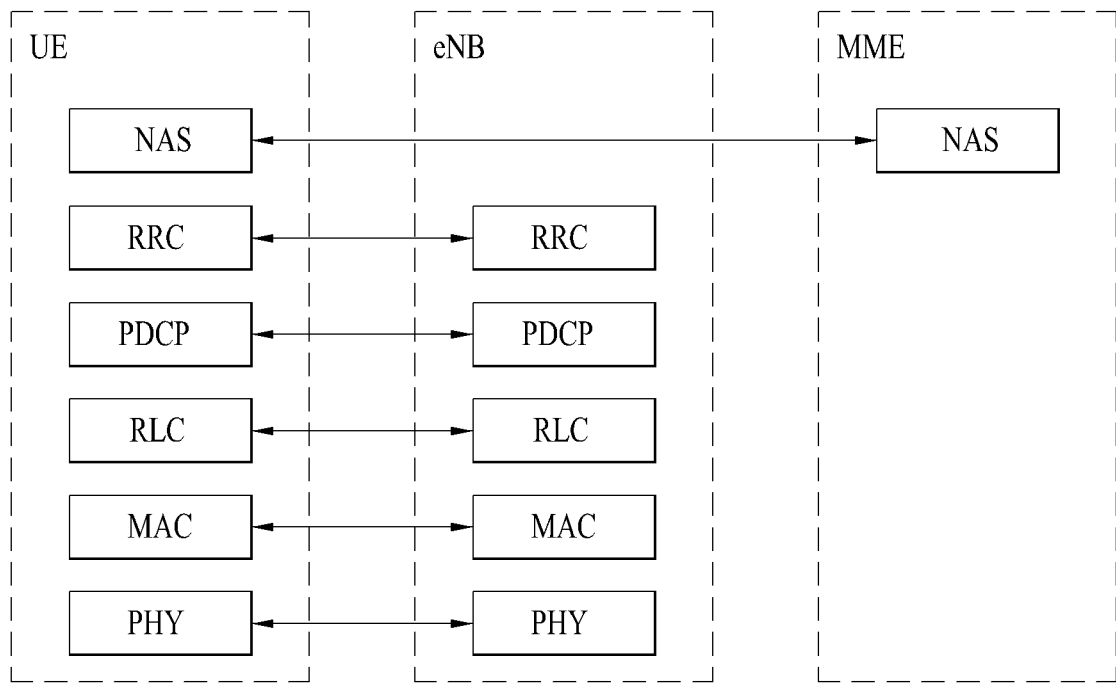
FIG. 5 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 5:
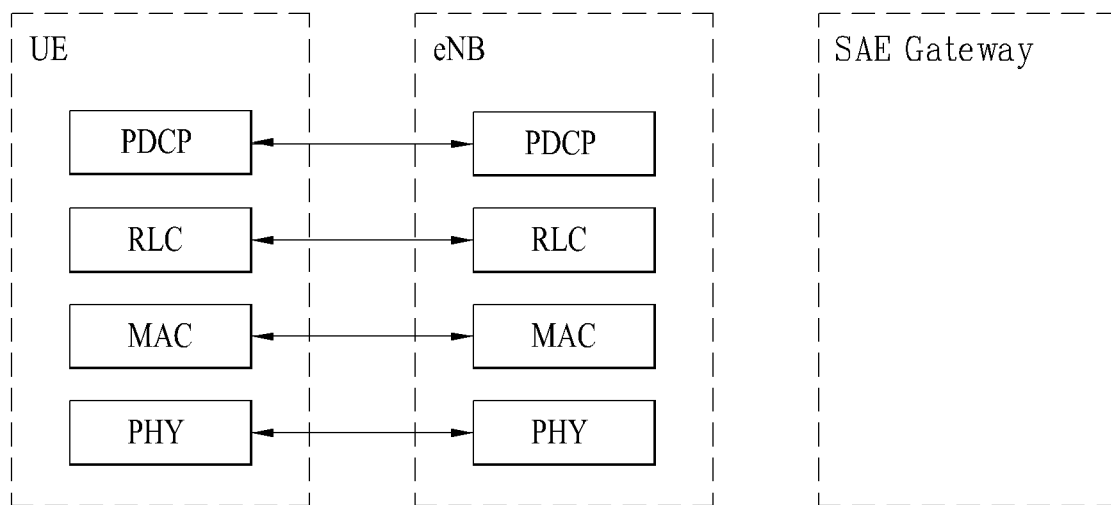

FIG. 5 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH)

carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

In the NR system, using an ultra-high frequency band, that is, a millimeter frequency band of 6 GHz or more, to transmit data a large number of users while maintaining a high data rate in a wide frequency band is taken into consideration. In 3GPP, this scheme is used and known as NR, which is referred to as NR system in the present disclosure.

Figure 6:
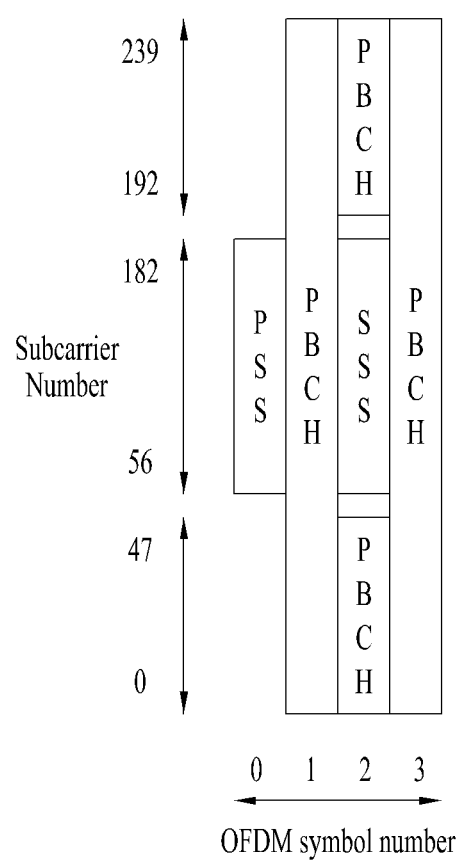
FIGS. 6 and 7 are diagrams illustrating an example of a structure and transmission of a synchronization signal/physical broadcast channel (SS/PBCH) block used in an NR system.

FIG. 6 illustrates an SSB structure. The UE may perform cell search, system information acquisition, beam alignment for initial access, DL measurement, etc. based on the SSB. The SSB and synchronization signal/physical broadcast channel (SS/PBCH) block are interchangeably used.

Referring to FIG. 6, an SSB includes a PSS, an SSS, and a PBCH. The SSB is configured over four consecutive OFDM symbols, and the PSS, PBCH, SSS/PBCH, and PBCH are transmitted on the respective OFDM symbols. The PSS and SSS may each consist of 1 OFDM symbol and 127 subcarriers, and the PBCH may consist of 3 OFDM symbols and 576 subcarriers. Polar coding and quadrature phase shift keying (QPSK) are applied to the PBCH. The PBCH may have a data RE and a demodulation reference signal (DMRS) RE for each OFDM symbol. There may be three DMRS REs for each RB, and there may be three data REs between DMRS REs.

The cell search refers to a procedure in which the UE acquires time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 1 below.

TABLE 1

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There may be 336 cell ID groups, and each cell ID group may have three cell IDs. There may be 1008 cell IDs in total. Information about a cell ID group to which a cell ID of a cell belongs may be provided/acquired through the SSS of the cell, and information about the cell ID among 336 cells in the cell ID may be provided/acquired through the PSS.

Figure 7:
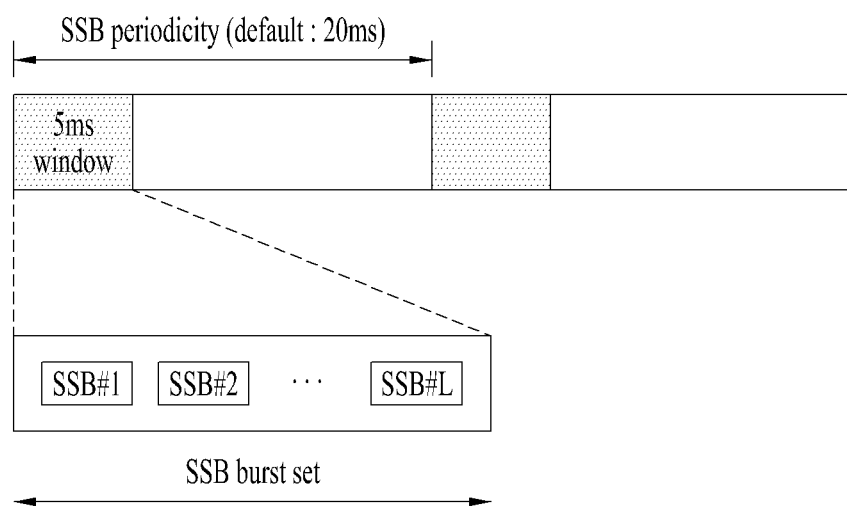
Figure 8:
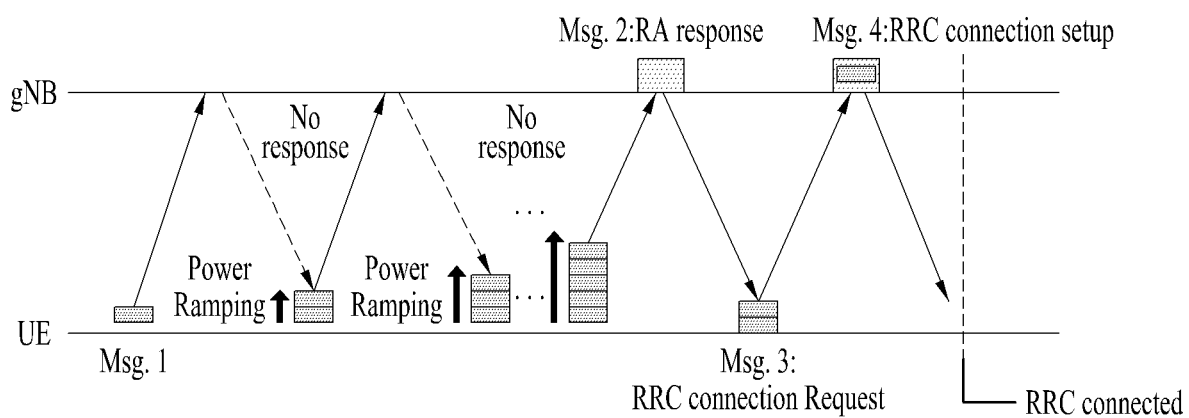
FIG. 8 is a diagram illustrating an example of a random access procedure.

FIG. 7 illustrates SSB transmission. Referring to FIG. 8, the SSB is periodically transmitted in accordance with the SSB periodicity. The basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). A SSB burst set may be configured at the beginning of the SSB periodicity. The SSB burst set may be configured with a 5 ms time window (i.e., half-frame), and the SSB may be repeatedly transmitted up to L times within the SS burst set. The maximum number of transmissions of the SSB, L, may be given according to the frequency band of the carrier wave as follows. One slot includes up to two SSBs.

For frequency range up to 3 GHz, L=4

For frequency range from 3 GHz to 6 GHz, L=8

For frequency range from 6 GHz to 52.6 GHz, L=64

The time position of an SSB candidate in the SS burst set may be defined according to the SCS as follows. The time position of the SSB candidate is indexed from 0 to L−1 in temporal order within the SSB burst set (i.e., half-frame) (SSB index).

Case A—15 kHz SCS: The index of the start symbol of a candidate SSB is given as {2, 8}+14*n. When the carrier frequency is lower than or equal to 3 GHz, n=0, 1. When the carrier frequency is 3 GHz to 6 GHz, n=0, 1, 2, 3.

Case B—30 kHz SCS: The index of the start symbol of a candidate SSB is given as {4, 8, 16, 20}+28*n. When the carrier frequency is lower than or equal to 3 GHz, n=0. When the carrier frequency is 3 GHz to 6 GHz, n=0, 1.

Case C—30 kHz SCS: The index of the start symbol of a candidate SSB is given as {2, 8}+14*n. When the carrier frequency is lower than or equal to 3 GHz, n=0. When the carrier frequency is 3 GHz to 6 GHz, n=0, 1, 2, 3.

Case D—120 kHz SCS: The index of the start symbol of a candidate SSB is given as {4, 8, 16, 20}+28*n. When the carrier frequency is higher than 6 GHz, n=0, 1, 2, 3, 5, 6, 7, 8, 10, 11, 12, 13, 15, 16, 17, 18.

Case E—240 kHz SCS: The index of the start symbol of a candidate SSB is given as {8, 12, 16, 20, 32, 36, 40, 44}+56*n. When the carrier frequency is higher than 6 GHz, n=0, 1, 2, 3, 5, 6, 7, 8.

The random access procedure of the UE may be summarized as shown in Table 2 and FIG. 8.

TABLE 2

| | Type of Signal | Operations/Information Acquired |
|---|---|---|
| 1st step | PRACH preamble on UL | * Initial beam acquisition<br>* Random selection of random access preamble ID |
| 2nd Step | Random Access Response on PDSCH | * Timing advance information<br>* Random access preamble ID<br>* Initial UL grant, Temporary C-RNTI |
| 3rd Step | UL transmission on PUSCH | * RRC connection request<br>* UE identifier |

TABLE 2-continued

| | Type of Signal | Operations/Information Acquired |
|---|---|---|
| 4th Step | Contention Resolution on DL | * Temporary C-RNTI on PDCCH for initial access<br>* C-RNTI on PDCCH for UE in RRC_CONNECTED |

The random access procedure is used for various purposes. For example, the random access procedure may be used for initial access to the network, handover, and UE-triggered UL data transmission. The UE may acquire UL synchronization and a UL transmission resource through the random access procedure. The random access procedure may be divided into a contention-based random access procedure and a contention-free random access procedure.

First, the UE may transmit a random access preamble on the PRACH as Msg1 of a random access procedure on UL.

Random access preamble sequences of two different lengths are supported. The long sequence length, 839, is applied for subcarrier spacings of 1.25 and 5 kHz, and the short sequence length, 139, is applied for subcarrier spacings of 15, 30, 60 and 120 kHz.

Multiple preamble formats are defined by one or more RACH OFDM symbols and different cyclic prefixes (and/or guard times). A RACH preamble configuration for a cell is included in the system information of the cell and provided to the UE. The RACH configuration includes information about subcarrier spacing, available preambles, a preamble format, and the like of the PRACH. The RACH configuration includes information about association between SSBs and RACH (time-frequency) resources. The UE transmits a random access preamble on a RACH time-frequency resource associated with the detected or selected SSB.

The threshold of the SSB for RACH resource association may be configured by the network, and transmission or retransmission of the RACH preamble is performed based on the SSB on which the reference signal received power (RSRP) measured based on the SSB satisfies the threshold. For example, the UE may select one of the SSB(s) that meet the threshold and transmit or retransmit the RACH preamble based on the RACH resource associated with the selected SSB.

When the BS receives the random access preamble from the UE, the BS may transmit a random access response (RAR) message (Msg2) to the UE. A PDCCH scheduling a PDSCH carrying the RAR is CRC masked with a random access (RA) radio network temporary identifier (RNTI) (RA-RNTI) and transmitted. Upon detecting the PDCCH masked with the RA-RNTI, the UE may receive the RAR on the PDSCH scheduled by the DCI carried by the PDCCH. The UE checks whether RAR information for the preamble transmitted by the UE, that is, Msg1, is in the RAR. Whether there is random access information for Msg1 transmitted by the UE may be determined based on presence f a random access preamble ID for the preamble transmitted by the UE. When there is no response to Msg1, the UE may retransmit the RACH preamble within a predetermined number of times while performing power ramping. The UE calculates the PRACH transmit power for retransmission of the preamble based on the most recent path loss and the power ramp counter.

The RAR information may include timing advance information for UL synchronization, a UL grant, and a UE temporary C-RNTI. When the UE receives RAR information about the UE on the PDSCH, the UE may obtain the timing advance information for UL synchronization, the initial UL grant and the UE temporary cell RNTI (C-RNTI). The timing advance information is used in controlling UL signal transmission timing. In order to allow the PUSCH/PUCCH transmission by the UE to be in better alignment with the subframe timing at the network end, the network (e.g. the BS) may measure the PUSCH/PUCCH/SRS reception and the difference in time between subframes and send timing advance information based thereon. The UE may perform UL transmission on the uplink shared channel through Msg3 of the random access procedure based on the RAR information. Msg3 may include an RRC connection request and a UE identifier. As a response to Msg3, the network may transmit Msg4, which may be treated as a contention resolution message on DL. Upon receiving Msg4, the UE may enter the RRC connected state.

The contention-free random access procedure may be performed when the UE performs handover to another cell or BS or may be performed when it is requested by the command of the BS. The basic operations of the contention-free random access procedure are similar to those the contention-based random access procedure. However, the contention-free random access procedure is different from the contention-based random access procedure, in which the UE randomly selects a preamble to use among a plurality of random access preambles, in that a preamble to be used by the UE (hereinafter, referred to as a dedicated random access preamble) is assigned to the UE by the BS. Information about the dedicated random access preamble may be included in an RRC message (e.g., a handover command) or provided to the UE through a PDCCH order. When the random access procedure is initiated, the UE transmits the dedicated random access preamble to the BS. When the UE receives the random access procedure from the BS, the random access procedure is completed.

As mentioned above, the UL grant in the RAR schedules a PUSCH transmission for the UE. A PUSCH carrying the initial UL transmission by the UL grant in the RAR may be referred to as an Msg3 PUSCH. The content of the RAR UL grant, which starts on the MSB and ends on the LSB, is given in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command may be used in determining the transmit power of the Msg3 PUSCH, and be interpreted according to, for example, Table 4.

TABLE 4

| TPC command | value [dB] |
|---|---|
| 0 | −6 |
| 1 | −4 |
| 2 | −2 |
| 3 | 0 |
| 4 | 2 |
| 5 | 4 |

TABLE 4-continued

| TPC command | value [dB] |
|---|---|
| 6 | 6 |
| 7 | 8 |

In the contention-free random access procedure, the CSI request field in the RAR UL grant indicates whether the UE is to include an aperiodic CSI report in the corresponding PUSCH transmission. The subcarrier spacing for Msg3 PUSCH transmission is provided by an RRC parameter. The UE will transmit the PRACH and Msg3 PUSCH on the same uplink carrier of the same serving cell. The UL BWP for Msg3 PUSCH transmission is indicated by SystemInformationBlock1 (SIB1).

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16QAM), 64-ary QAM (64QAM), or 256-ary QAM (256 QAM). A TB is encoded to a codeword. The PDSCH may deliver up to two codewords. The codewords are individually scrambled and modulated, and modulation symbols of each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 9:
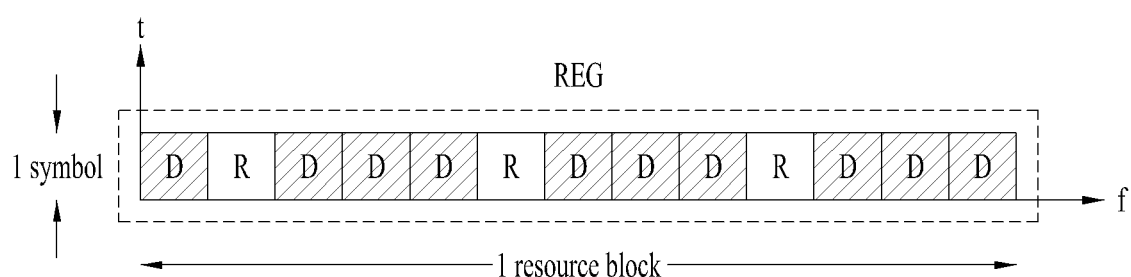
FIGS. 9 to 11 are views illustrating a physical downlink control channel (PDCCH) in the NR system.
Figure 10:
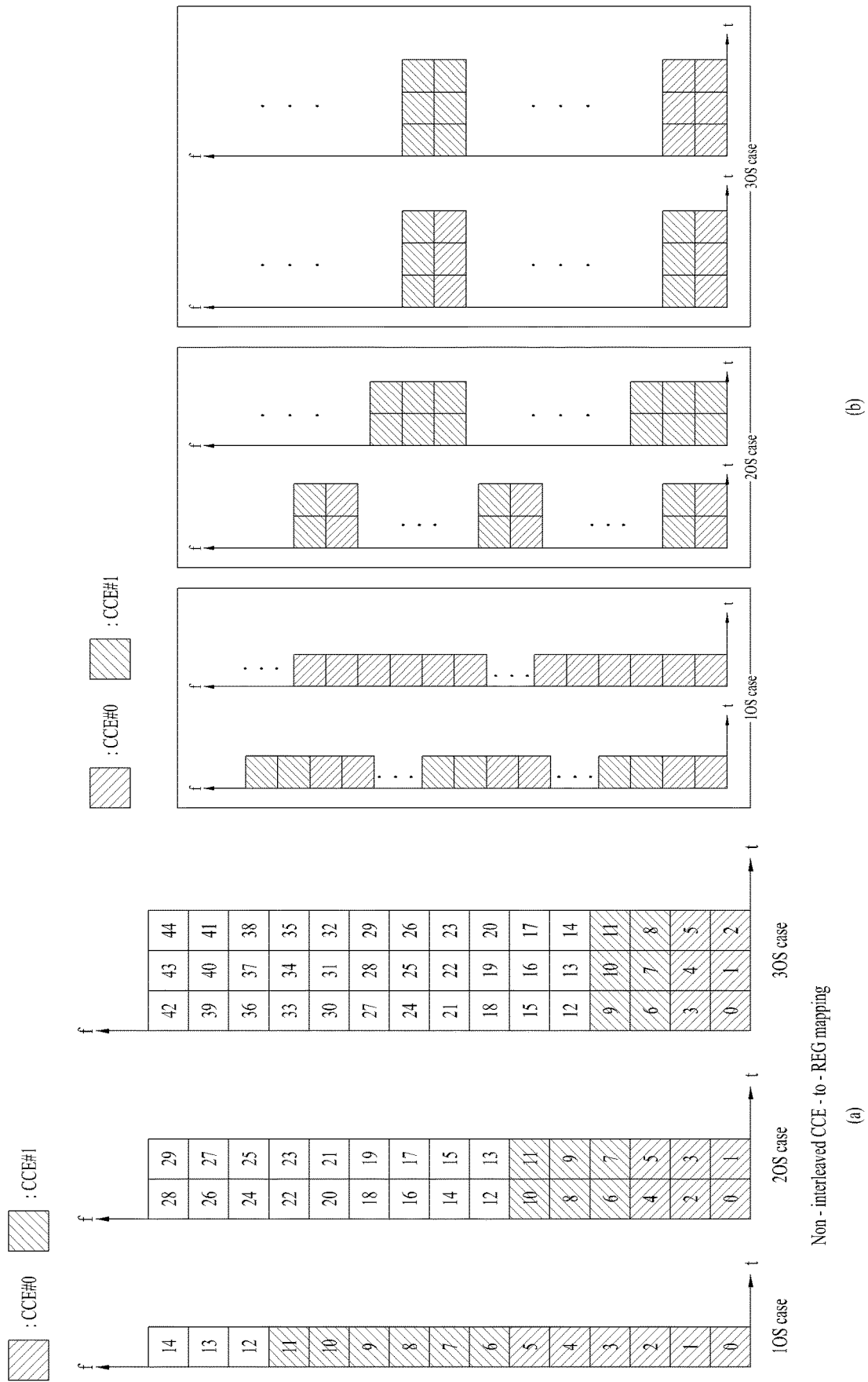

FIG. 9 illustrates an exemplary structure of one REG. In FIG. 9, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type. FIG. 10(a) is an exemplary view illustrating non-interleaved CCE-REG mapping, and FIG. 10(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 11:
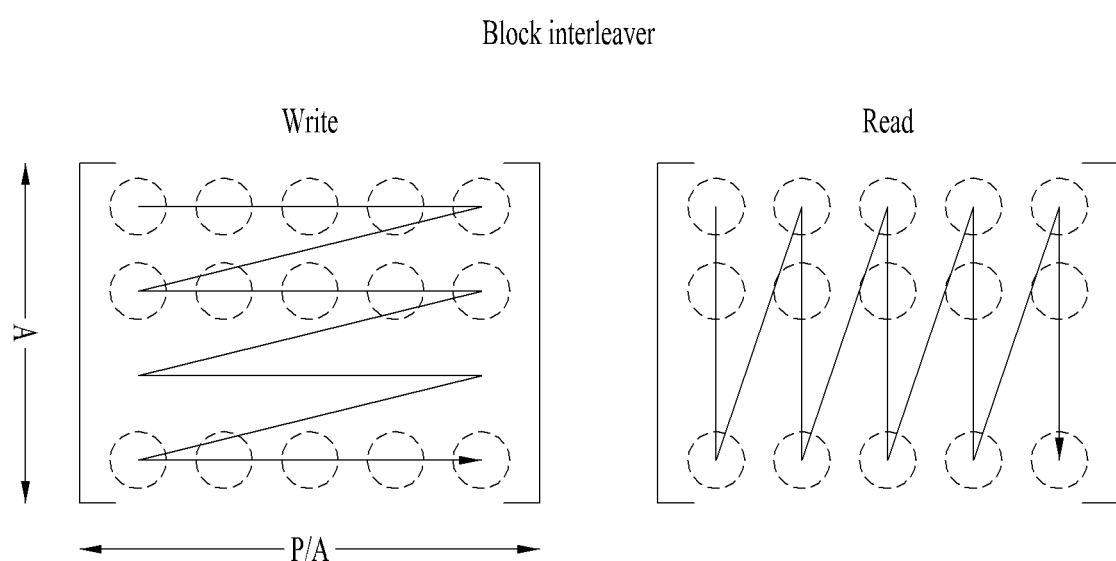

FIG. 11 illustrates an exemplary block interleaver. For the above interleaving operation, the number of rows in a (block) interleaver is set to one or 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. 11. Cyclic shift (CS) of an interleaving unit is applied based on an ID which is configurable independently of a configurable ID for the DMRS.

A UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in unit of slot) and a PDCCH monitoring offset (in unit of slot).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type 1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 5-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

Demodulation Reference Signal (DMRS)

A DMRS of NR is characteristically transmitted, only when necessary, to reinforce network energy efficiency and guarantee forward compatibility. Density of DMRSs in the time domain may vary according to speed or mobility of a UE. To track fast variation of a radio channel in NR, density of DMRSs in the time domain may increase.

1. DL DMRS Related Operation

A DMRS related operation for PDSCH transmission/reception will now be described.

An eNB transmits DMRS configuration information to the UE. The DMRS configuration information may refer to a DMRS-DownlinkConfig information element (IE). The DMRS-DownlinkConfig IE may include a dmrs-Type parameter, a dmrs-AdditionalPosition parameter, a maxLength parameter, and a phaseTrackingRS parameter. The 'dmrs-Type' parameter is a parameter for selecting a DMRS type to be used for DL. In NR, the DMRS may be divided into two configuration types: (1) DMRS configuration type 1 and (2) DMRS configuration type 2. DMRS configuration type 1 has a higher RS density in the frequency domain and DMRS configuration type 2 has more DMRS antenna ports. The 'dmrs-AdditionalPosition' parameter is a parameter indicating the position of an additional DMRS on DL. The 'maxLength' parameter is a parameter indicating the maximum number of OFDM symbols for a DL front-loaded DMRS. The 'phaseTrackingRS' parameter is a parameter for configuring a DL PTRS.

The first position of the front-loaded DMRS is determined according to a PDSCH mapping type (Type A or Type B) and an additional DMRS may be configured to support the UE at a high speed. The front-loaded DMRS occupies one or two consecutive OFDM symbols and is indicated by RRC signaling and DCI.

The eNB generates a sequence used for the DMRS based on the DMRS configuration. The eNB maps the generated sequence to REs. Here, the RE may include at least one of time, frequency, an antenna port, or a code.

The eNB transmits the DMRS to the UE on the REs. The UE receives the PDSCH using the received DMRS.

2. UL DMRS Related Operation

A DMRS related operation for PUSCH reception will now be described.

The UL DMRS related operation is similar to the DL DMRS related operation, and the terms of parameters related to DL may be replaced with the terms of parameters related to UL. For example, the DMRS-DownlinkConfig IE may be replaced with a DMRS-UplinkConfig IE, the PDSCH mapping type may be replaced with a PUSCH mapping type, and the PDSCH may be replaced with a PUSCH. In the DL DMRS related operation, the eNB may be replaced with the UE and the UE may be replaced with the eNB.

Generation of a sequence for the UL DMRS may be differently defined depending on whether transform precoding is enabled. For example, if cyclic prefix orthogonal frequency division multiplexing (CP-OFDM) is used (i.e., transform precoding is not enabled), the DMRS uses a pseudo-noise (PN) sequence, and if discrete Fourier transform-spread-OFDM (DFT-s-OFDM) is used (i.e., transform precoding is enabled), a Zadoff-Chu (ZC) sequence having a length of 30 or more is used.

Bandwidth Part (BWP)

The NR system may support up to 400 MHz per carrier. If a UE operating in such a wideband carrier always keeps a radio frequency (RF) module on for the whole carrier, the battery consumption of the UE may increase. Further, considering multiple use cases (e.g., eMBB, URLLC, mMTC, V2X, etc.) operating in one wideband carrier, different numerologies (e.g., SCSs) may be supported for different frequency bands of the carrier. Further, each UE may have a different capability regarding a maximum bandwidth. In this regard, the eNB may indicate the UE to operate only in a partial bandwidth, not the total bandwidth of the wideband carrier. The partial bandwidth is referred to as a bandwidth part (BWP). A BWP in the frequency domain is a subset of contiguous common RBs defined for numerology $\mu_i$ in BWP i of the carrier, and one numerology (e.g., SCS, CP length, and/or slot/mini-slot duration) may be configured for the BWP.

The eNB may configure one or more BWPs in one carrier configured for the UE. If UEs are concentrated in a specific BWP, some of the UEs may be switched to another BWP, for load balancing. For frequency-domain inter-cell interference cancellation between adjacent cells, BWPs at both ends of the total bandwidth of a cell except for some center spectrum may be configured in the same slot. That is, the eNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

Figure 13:
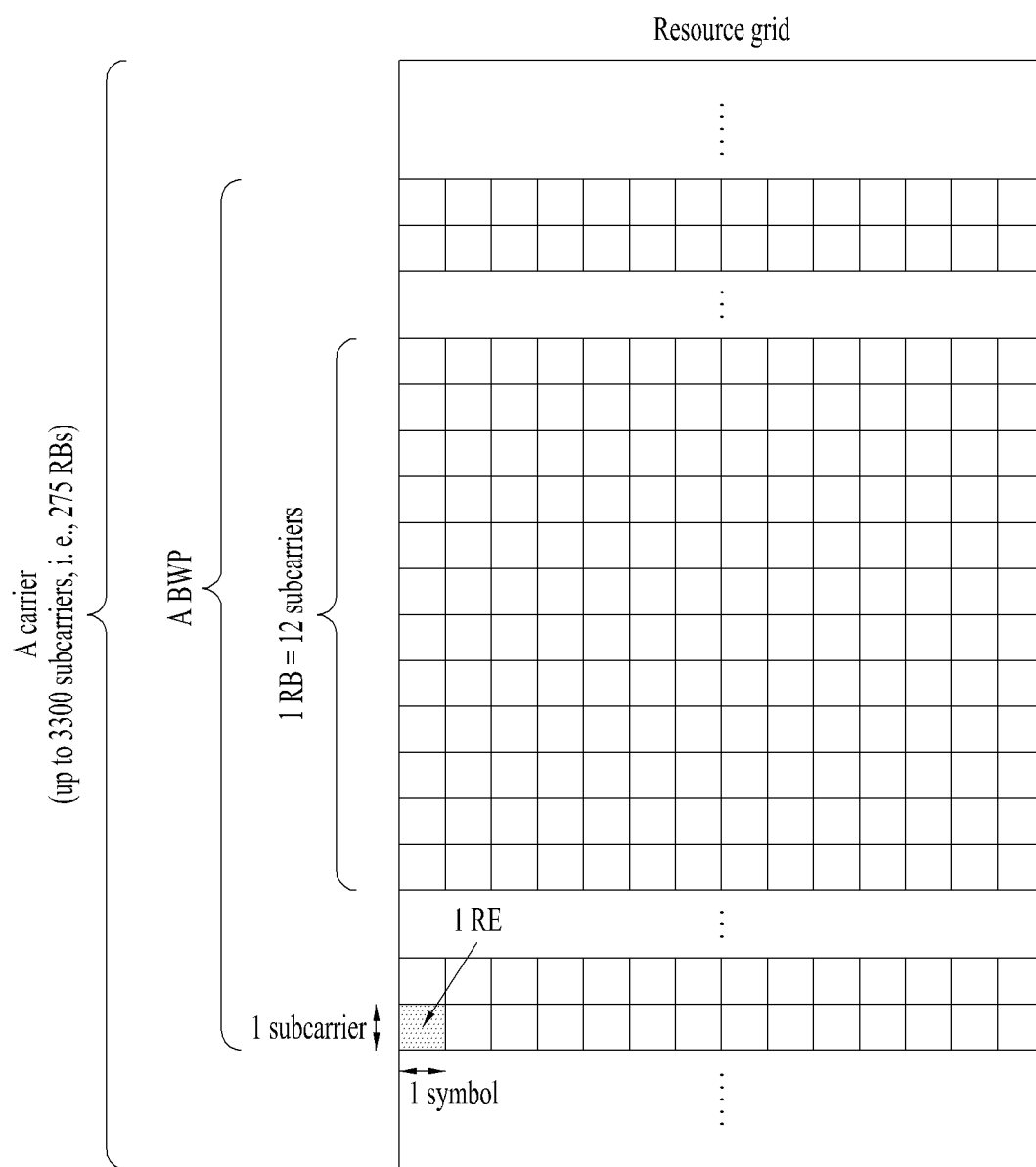

FIG. 13 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 7 illustrates that the number of symbols per slot, the number of slots per frame, and the number of slots per subframe vary according to the SCS when the normal CP is used.

TABLE 7

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{subframe,u}_{slot}$: Number of slots in a subframe
* $N^{slot}_{symb}$: Number of symbols in a slot
* $N^{frame,u}_{slot}$: Number of slots in a frame Table 8 illustrates that the number of symbols per slot, the number of slots per frame, and the number of slots per subframe vary according to the SCS when the extended CP is used.

TABLE 8

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 13 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 14:
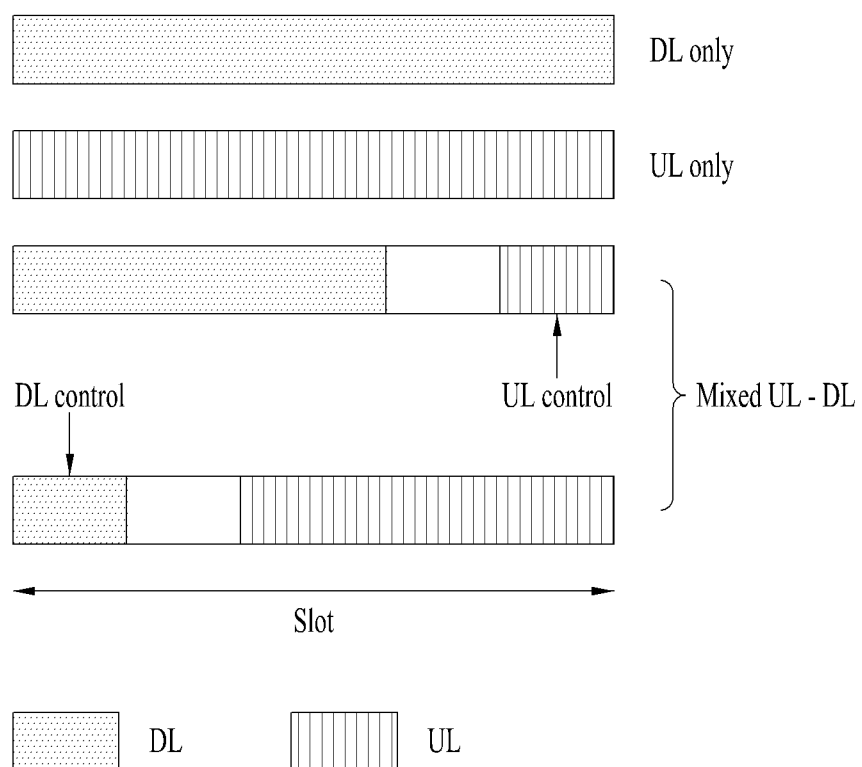

FIG. 14 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

In the NR system, a DL channel and/or a DL signal may be transmitted and received within an active DL downlink bandwidth part (BWP). In addition, a UL channel and/or a UL signal may be transmitted and received within an active UL uplink bandwidth part (BWP). The DL BWP and/or UL BWP may be defined or configured in a common resource block (RB) grid. The common RB grid may be changed dynamically and/or semi-statically by the BS.

A plurality of BWPs may be configured in various ways in the common RB grid, and information about the common RB grid may be used as a reference point of DMRS configuration and/or a reference point of RB or RB group (RBG) configuration in consideration of MU-MIMO or multiplexing between UEs operating in different BWPs.

In the NR system, the information about the common RB grid may be indicated by the BS to the UE through system information block 1 (SIB1). Accordingly, the UE may not recognize information about the common RB grid until the SIB1 is successfully received. Alternatively, ambiguity about the common RB grid may occur until the common RB grid information is changed through SIB1 update.

Thus, it is necessary to define a default mode operation that the UE may refer to as a reference point when the UE does not identify the information about the common RB grid or an ambiguity of information about the common RB grid occurs. In other words, there may be a need for a method for receiving a DMRS irrespective of the common RB gird when the UE does not identify the information about the common RB grid, or when the ambiguity of the information about the common RB grid occurs, and/or a resource allocation method for the DMRS.

In addition, when the UE receives a DL signal in the PSCell or the SCell, multiplexing with a UE having the cell as the PCell may be considered. Similarly, when the UE performs handover, and transmission and reception are started in a target cell, there may be a need for definition of a method for a default mode operation of the UE considering SIB1 transmission already operating in the cell.

In the present disclosure, a method for operation of the UE in an area where the UE is to receive broadcast information including SIB1 and/or an area where another UE is to receive broadcast information including SIB1 is proposed. Here, the operation method of the UE may be, for example, a DMRS generation method, an assumption about a reference point, and/or a resource allocation method. In addition, according to the present disclosure, a method for operation in an SCell when initial BWP-based operations such as DCI size configuration and/or DCI size conversion are performed in an NR system is proposed.

Figure 15:
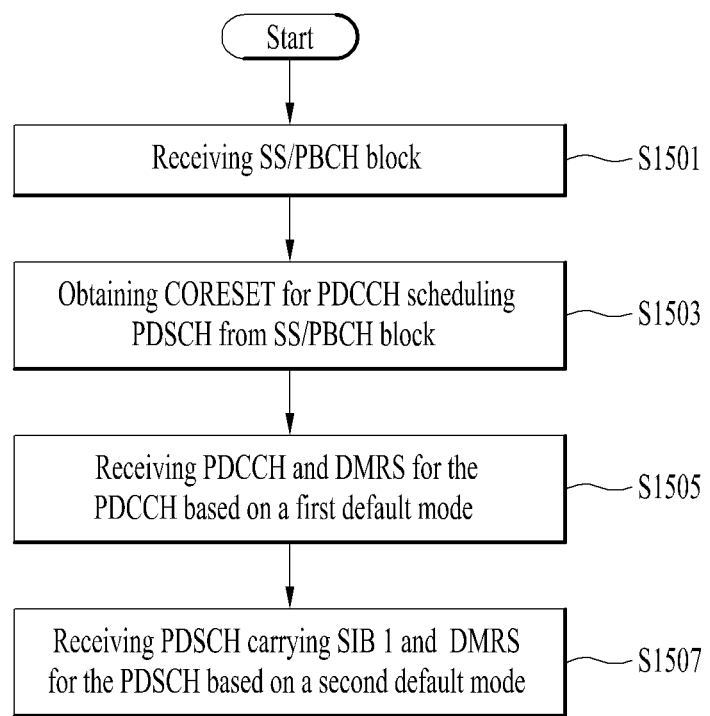
FIGS. 15 to 17 are diagrams illustrating an example of operation implementation of a UE, a base station, and a network according to the present disclosure.
Figure 16:
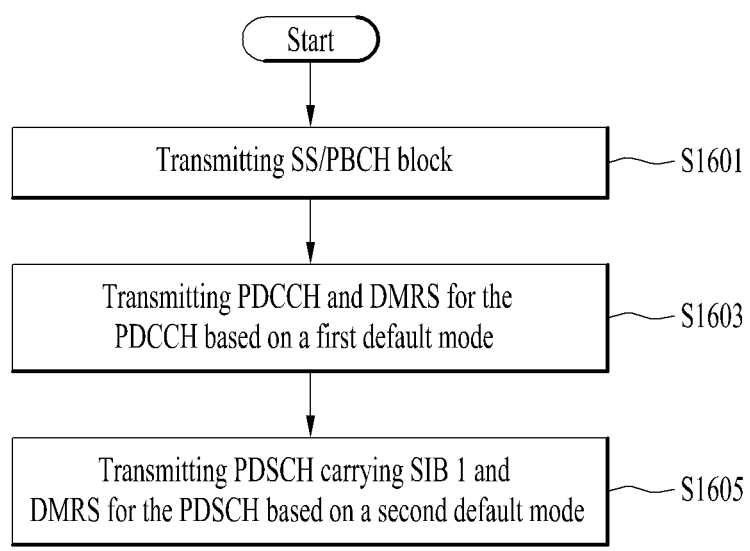
Figure 17:
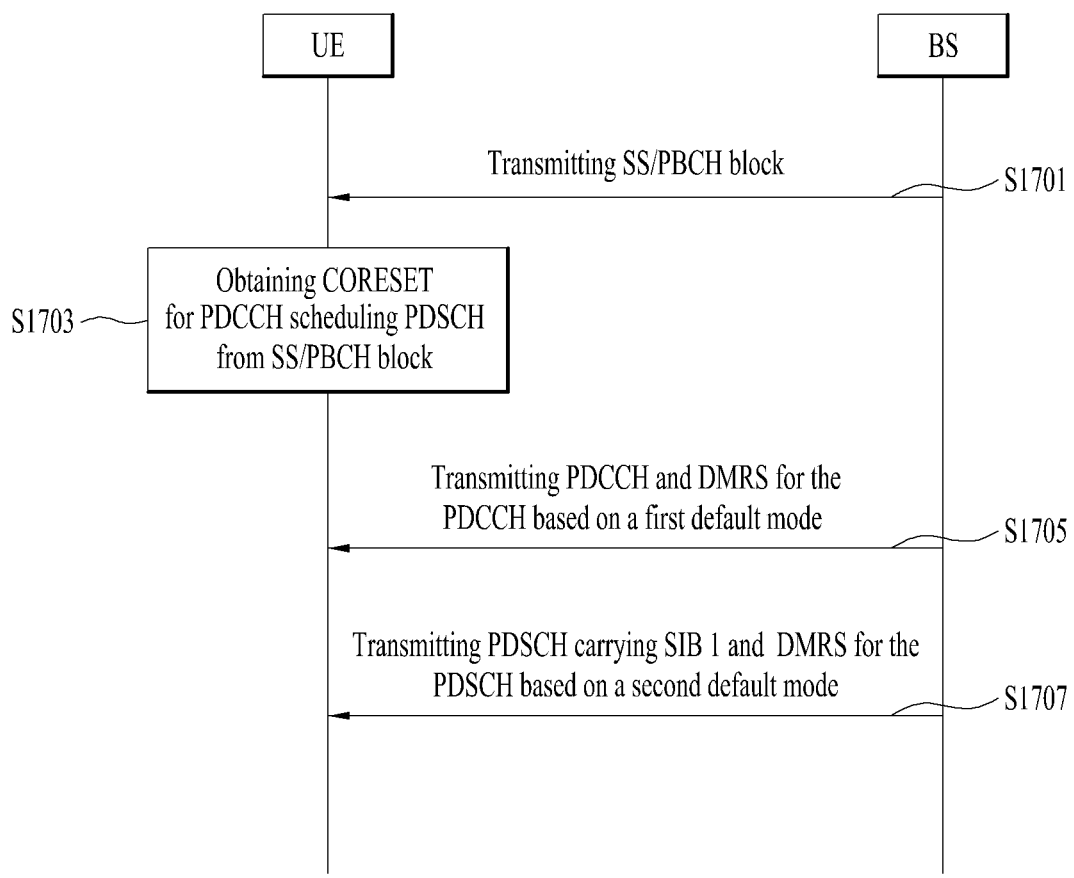

FIGS. 15 to 17 are diagrams illustrating an exemplary operation implementation of a UE, a base station, and a network according to the present disclosure.

An example of operation implementation of a UE according to the present disclosure will be described with reference to FIG. 15. A UE may receive a synchronization signal/physical broadcast channel block (SS/PBCH) block (S1501), and obtain information about a control resource set (CORESET) for a physical downlink control channel (PDCCH) for scheduling a physical downlink shared channel (PDSCH) from the master information block (MIB) included in the PBCH of the SS/PBCH block (S1503).

Then, the UE may receive a PDCCH and a demodulation reference signal (DMRS) through a search space of the CORESET based on a first default mode (S1505). Here, the method and condition for receiving the DMRS based on the first default mode may be based on conditions 1-1 to 1-2, which will be described later.

The UE may receive the PDSCH, which carries SIB 1, and the DMRS for the PDSCH based on a second default mode according to the scheduling information about the PDSCH obtained from the received PDCCH (S1507). Here, the method and condition for receiving the DMRS based on the second default mode may be based on conditions 2-1 and 2-2, which will be described later.

The UE receiving the SIB1 may obtain initial bandwidth part (BWP) information through SIB1, and receive downlink control information (DCI) including group TPC information based on the initial BWP information. In this case, the method for generating the DCI including the group TPC information and the method for transmitting/receiving the same may be based on Methods 1-1 to 1-3 and Methods 2-1 and 2-2, which will be described later.

FIG. 16 illustrates an example of operation implementation of a BS according to the present disclosure. Referring to FIG. 16, a BS may transmit an SS/PBCH block (S1601), and transmit a PDCCH and a DMRS for the PDCCH based on a first default mode according to the information about the CORESET transmitted through the MIB included in the PBCH of the SS/PBCH block, (S1603).

In this case, the method and condition for generating and transmitting the DMRS based on the first default mode may be based on conditions 1-1 and 1-2, which will be described later.

Then, the BS may transmit a PDSCH, which carries SIB1, and the DMRS for the PDSCH based on a second default mode according to the scheduling information included in the PDCCH. In this case, the method and condition for generating and transmitting the DMRS based on the second default mode may be based on conditions 2-1 and 2-2, which will be described later.

In addition, the BS transmitting SIB1 may transmit initial BWP information through SIB1, and transmit DCI including group TPC information based on the initial BWP information. In this case, the method for generating the DCI including the group TPC information and the method for transmitting/receiving the same may be based on Methods 1-1 to 1-3 and Methods 2-1 and 2-2, which will be described later.

FIG. 17 illustrates an example of operation implementation of a network according to the present disclosure. Referring to FIG. 17, the BS may transmit an SS/PBCH block to the UE (S1701). The UE may acquire information about a CORESET for a PDCCH for scheduling of a PDSCH from a master information block (MIB) included in a PBCH of the SS/PBCH block (S1703). The BS may transmit the PDCCH and a DMRS for the PDCCH to the UE based on a first default mode according to the information about the CORESET (S1705). In this case, the method and condition for generating and transmitting the DMRS based on the first default mode may be based on conditions 1-1 and 1-2, which will be described later.

Then, the BS may transmit, to the UE, a PDSCH, which carries SIB1, and the DMRS for the PDSCH based on a second default mode according to the scheduling information included in the PDCCH (S1707). In this case, the method and condition for generating and transmitting the DMRS based on the second default mode may be based on conditions 2-1 and 2-2, which will be described later.

In addition, the UE may obtain initial BWP information through SIB1 received from the BS, and the BS may transmit DCI including group TPC information to the UE based on the initial BWP information. In this case, the method for generating the DCI including the group TPC information and the method for transmitting/receiving the same may be based on Methods 1-1 to 1-3 and Methods 2-1 and 2-2, which will be described later.

Hereinafter, a method for transmitting the PDCCH/PDSCH and the DMRS according to the default mode operations will now be described in detail with reference to FIGS. 15 to 17.

First, a method for transmitting the DMRS and the PDCCH based on the default mode operations on the PDCCH will be described.

The UE may initially derive an initial DL BWP (e.g., BWP #0) based on an SS/PBCH block, the MIB in the PBCH, and/or information included in the PBCH payload.

Here, the initial DL BWP may be BWP #0, but is not limited thereto. For example, when the number of BWPs configured by a higher layer is less than 3, the initial DL BWP may be BWP #0. When the number of BWPs configured by the higher layer is 4, the initial DL BWP may be a BWP other than BWP #0.

Specifically, a CORESET configuration and a search space configuration for receiving SIB1 may be received from the MIB and/or PBCH payload in the PBCH are received. Such information may be operatively connected with the SS/PBCH. In this case, the initial DL BWP may be initially configured in the frequency domain for the CORESET. In performing addition or handover of a PSCell or an SCell, the UE may receive SS/PBCH block information about a corresponding cell, and the CORESET configuration and search space configuration for SIB1 reception of the cell through a dedicated signal, and be provided with configuration of an initial DL BWP (e.g., BWP #0).

Here, in performing addition or handover of a PSCell or an SCell, the CORESET obtained through the dedicated signal and the CORESET obtained through the MIB/PBCH payload may be referred to as CORESET #0. They may be a kind of common CORESET.

In addition, in performing addition or handover of a PSCell or an SCell, the search space obtained through the dedicated signal and the search space obtained through the MIB/PBCH payload may be referred to as a Type-0 PDCCH common search space. For simplicity, in the present disclosure, these spaces may be referred to as "search space #0." Search space #0 may be used to transmit and receive a PDCCH for system information.

The SS/PBCH block information about the serving cell may include information about a frequency position at which the SS/PBCH block is transmitted. In addition, the CORESET configuration and the search space configuration for reception of SIB1 of the cell may be received through the MIB and/or PBCH payload included in the PBCH of the cell. The UE may derive CORESET #0 and/or search space #0 for the serving cell based on the above-mentioned information.

A UE having each serving cell as a PCell may receive SIB1 in the corresponding cell. In this case, a default mode in which a PDCCH may be received regardless of the common RB grid may be operated. In addition, even when the UE is connected in the cell which is a PSCell or a SCell or receives the PDCCH in the cell after the handover, the UE may need to operate in a default mode, depending on the operation region of the UE.

For example, in the default mode, a reference point serving as a reference for generation of a DMRS may be subcarrier 0 of the lowest-numbered RB of a CORESET in which a PDCCH is transmitted. In this case, a PDCCH transmission/mapping method such as the actual position of index 0 and/or presence/absence of interleaving, and interleaving units may be determined based on the reference point. The DMRS may correspond to both a DMRS for the PDCCH and a DMRS for the PDSCH.

The CORESET in which the PDCCH is transmitted may be represented in different ways. For example, assuming that an operation for reception of SIB1 is performed, the CORESET may be represented as CORESET #0 or a CORESET configured by an SIB (e.g., SIB1) or a PBCH.

In addition, the CORESET configured by SIB1 may refer to a CORESET separately configured through SIB1 for a random access response (RAR). It may be assumed that the CORESET is configured using the same method as the method of designating SIB1 on the PBCH within the initial DL BWP for alignment with CORESET #0 configured by the PBCH. For example, this assumption may be applied only when the initial DL BWP configured through SIB1 does not override the initial DL BWP configured by the PBCH. When the initial DL BWP configured through SIB1 overrides the initial DL BWP configured by the PBCH, it may be assumed that CORESET configuration is performed based on the common RB grid.

Hereinafter, conditions under which the default mode for PDCCH reception operating regardless of the common RB grid operates will be described in detail.

Condition 1-1:

When a region in which the PDCCH corresponding to a serving cell is transmitted is CORESET #0 and/or search space #0, the PDCCH may be transmitted based on the default mode regardless of the common RB grid. When multiple search spaces are configured for the UE and the UE receives the PDCCH through the multiple search spaces, if a specific search space related to CORESET #0 fully or partially overlaps with search space #0, it may be assumed that the PDCCH transmitted at the overlapping time corresponds to search space #0. For example, the UE may configure or use CORESET #0 and/or search space #0 even for BWPs other than an initial DL BWP such as BWP #0. Even in this case, if the UE receives the PDCCH through CORESET #0 and/or search space #0, the PDCCH may be received based on the default mode.

Condition 1-2:

When a region in which the PDCCH corresponding to the serving cell is transmitted is an initial DL BWP such as BWP #0, the PDCCH may be transmitted based on the default mode regardless of the common RB grid.

In this case, other broadcast information is still allowed to be transmitted in the initial DL BWP even if the UE successfully receives SIB1, and thus the UE is aware of information about the common RB grid. Accordingly, the PDCCH may be received in the initial DL BWP based on the default mode regardless of whether the PDCCH is received before or after SIB1 is successfully detected, when it is considered that a signal related to the broadcast information and the PDCCH are multiplexed. In this case, this example may be limited to the case where the PDCCH is a PDCCH received in a common search space. The reason is that, when the PDCCH is transmitted through a UE-specific search space, the DMRS sequence generation seed will differ between UEs regardless of the reference point, and thus the DMRS will differ between the UEs.

In Conditions 1-1 and 1-2 described above, even when a CORESET ID, a search space ID, and/or a BWP ID, in which the PDCCH is transmitted, is not 0, the PDCCH may be detected on the assumption that the PDCCH is included in a specific CORESET, search space, and/or BWP, if the configuration values of the CORESET, search space, and/or BWP are fully or partially equal to CORESET #0, search space #0, and BWP #0, respectively, or the IDs or types of the CORESET, search space, and/or BWP through which the PDCCH is transmitted are not distinguished from each other. Here, the specific CORESET, search space, and/or BWP may be CORESET #0, search space #0, and BWP #0, respectively.

Hereinafter, a method for transmitting the DMRS and PDSCH based on the default mode operation in the PDSCH will be discussed.

In the NR system, SIB1 including information about the common RB grid may be transmitted on the PDSCH. Accordingly, a default mode operation that is independent of the common RB grid needs to be defined to receive at least the PDSCH carrying SIB1.

As an example of the default mode, a reference point for generating the DMRS related to the PDSCH may be subcarrier 0 of the lowest-numbered RB of a CORESET in which a PDCCH for scheduling the PDSCH is transmitted. The CORESET in which the PDCCH is transmitted may be represented in different ways. For example, assuming that an operation for reception of SIB1 is performed, the CORESET may be represented as CORESET #0 or a CORESET configured by an SIB (e.g., SIB1) or a PBCH.

As another example of the default mode, an RB bundle, which is a basic unit in interleaved VRB-to-PRB mapping, may be defined starting from subcarrier 0 of the lowest-numbered RB of the CORESET in which the PDCCH for scheduling the PDSCH is transmitted. In other words, the boundary of the RB bundle is aligned with the boundary of the initial DL BWP or the boundary of the CORESET region in which the PDCCH is transmitted. The default mode may be configured in various combinations of the examples of the two default modes described above.

However, in the system information including SIB1, the related PDCCH/PDSCH may commonly use an SI-RNTI. Therefore, when the PDSCH is received, whether the information included in the PDSCH is SIB1 may be recognized only after the PDSCH is decoded. The BS may transmit system information in a third BWP after initial access. In this case, the BS may transmit the PDCCH/PDSCH based on information about the common RB grid, and the UE may expect the PDCCH/PDSCH will be received based on the common RB grid.

Hereinafter, the conditions for receiving the PDSCH based on the default mode regardless of the common RB gird will be described.

Condition 2-1:

When a region in which a PDCCH for scheduling a PDSCH corresponding to a serving cell is transmitted is CORESET #0 and/or search space #0, the PDSCH may be transmitted based on the default mode regardless of the common RB grid.

When multiple search spaces are configured for the UE and the UE receives the PDCCH through the multiple search spaces, if a specific search space related to CORESET #0 fully or partially overlaps with search space #0, it may be assumed that the PDCCH transmitted at the overlapping time corresponds to search space #0. For example, the UE may configure or use CORESET #0 and/or search space #0 even for BWPs other than an initial DL BWP such as BWP #0. Even in this case, if the UE receives the PDCCH and/or PDSCH through #0 and/or the search space #0, the PDCCH and/or PDSCH may be received based on a default mode. The PDSCH may be received based on the default mode only when the PDCCH for scheduling the PDSCH is addressed to an SI-RNTI. In other words, the PDSCH may be received based on a default mode when the PDCCH for scheduling the PDSCH is transmitted through CORESET #0 and/or search space #0 while the PDCCH is addressed to the SI-RNTI. This is because the PDCCH for scheduling the PDSCH for SIB1 will be the PDCCH addressed to the SI-RNTI transmitted through the search space #0 in CORESET #0.

Condition 2-2:

When a region in which the PDCCH for scheduling the PDSCH is transmitted is an initial DL BWP such as BWP #0, the PDSCH may be transmitted based on the default mode regardless of the common RB grid. In this case, other broadcast information is still allowed to be transmitted in the initial DL BWP even if the UE successfully receives SIB1, and thus the UE is aware of information about the common RB grid. Accordingly, the PDCCH may be received in the initial DL BWP based on the default mode regardless of whether the PDCCH is received before or after SIB1 is successfully detected, when it is considered that a signal related to the broadcast information and the PDSCH are multiplexed. In this case, this example may be limited to the case where the PDCCH for scheduling the PDSCH is a PDCCH received in a common search space. The reason is that, when the PDCCH for scheduling the PDSCH is transmitted through a UE-specific search space, the DMRS sequence generation seed will differ between UEs regardless of the reference point, and thus the DMRS will differ between the UEs.

In Conditions 2-1 and 2-2 described above, even when a CORESET ID, a search space ID, and/or a BWP ID, in which the PDCCH is transmitted, is not 0, the PDCCH for scheduling a PDSCH may be detected on the assumption that the PDCCH is included in a specific CORESET, search space, and/or BWP, if the configuration values of the CORESET, search space, and/or BWP are fully or partially equal to CORESET #0, search space #0, and BWP #0, respectively, or the IDs or types of the CORESET, search space, and/or BWP through which the PDCCH is transmitted are not distinguished from each other. Here, the specific CORESET, search space, and/or BWP may be CORESET #0, search space #0, and BWP #0, respectively.

For the PDSCH, conditions for using the default mode may differ according to the content of the default mode. For example, the conditions for using the default mode may differ depending on whether the default mode is used for designation of a reference point for a DMRS or a reference point for RB bundle configuration during interleaved VRB-to-PRB mapping. For example, a default mode operation for interleaved VRB-to-PRB mapping may be applied only to a specific cell such as a PCell.

The default mode for interleaved VRB-to-PRB mapping may be used before the UE configures information about a BWP (e.g., a starting RB index and/or the number of RBs of the BWP). In this case, the UE may assume that the size of the first RB bundle for interleaved VRB-to-PRB mapping is $N_{BWP,i}^{Start} \mod L_i=0$, and the size of the last RB bundle is $(N_{BWP,i}^{Start}+N_{BWP,i}^{size}) \mod L_i = N_{BWP,i}^{size} \mod L_i$. Here, $N_{BWP,i}^{Start}$ may denote a starting RB of BWP i, $N_{BWP,i}^{size}$ may denote the RB size or the number of RBs of BWP i, and $L_i$ may denote the bundle size of BWP i.

However, the equations given above are merely an example and may be expressed in other forms. In other words, the equations given above may be understood as an extension from the basic idea of the present disclosure of configuring the RB bundle starting with the first subcarrier of an active (DL) BWP that is currently assumed by the UE.

In addition, the size of the BWP may be expressed in other forms. For example, the initial BWP may be represented by the number of RBs constituting a specific CORESET, such as CORESET #0, or the total number of consecutive RBs from the lowest RB to the highest RB.

As another example, the default mode for interleaved VRB-to-PRB mapping may be performed based on a CORESET associated with the PDCCH for scheduling the PDSCH, the size of a specific BWP such as the size of an initial DL BWP, the RB bundle size, and/or a common RB grid. Here, performing the default mode for the interleaved VRB-to-PRB mapping based on the common RB grid may be, for example, performing the default mode for the interleaved VRB-to-PRB mapping based on Point A or the first subcarrier 0 of the first RB in the common RB grid. In this case, the first subcarrier 0 of the first RB may refer to subcarrier 0 of the lowest-numbered RB.

Specifically, a target region of interleaving in interleaved VRB-to-PRB mapping may be a set of consecutive RBs corresponding to the size of a specific BWP, such as the size of the initial DL BWP, from the lowest-numbered RB index of a CORESET. When N is the lowest-numbered RB index of the CORESET in the common RB grid, the size of the initial DL BWP is B, and the RB bundle size is L, the number of RB bundles may be an integer conversion value (e.g., a ceiling value) of (B+(N mod L))/L.

The above example is merely an example of generating an RB bundle based on a common RB grid. The term (N mod L) may be omitted, and an integer conversion value of B/L may be used as the number of RB bundles.

RB bundle 0 may include L−(N mod L) RBs. The example is also merely an example of generating an RB bundle based on a common RB grid. (N mode L) may be omitted and L BRs may constitute RB bundle 0.

The last RB bundle may include (N+B) mod L RBs (if (N+B) mod L>0) or L RBs (if (N+B) mod L=0). This example is also merely an example of generating an RB bundle based on the common RB grid. N may be omitted, and thus the last RB bundle may include B mod L RBs (if (N+B) mod L>0) or L RBs (if B mod L=0). In the example above, the initial DL BWP size may be expressed in another form. For example, it may be replaced by the number of RBs constituting a CORESET (e.g., CORESET #0) that is referenced in configuring the initial DL BWP.

In addition, the above-described default mode may be operated when DCI for scheduling the PDSCH is transmitted in a common search space. However, the default mode may not be applied when the entirety or part of the search space and/or CORESET for SIB1 overlaps with the common search space in which the DCI is transmitted. Here, the case where the entirety or part of the search space and/or CORESET for SIB1 overlaps with the common search space in which the DCI is transmitted may refer to, for example, the time when the common search space overlaps with the search space and/or CORESET for SIB1. In this case, even if UEs having different BWPs share the same common search space while using interleaved VRB-to-PRB mapping, it may assumed that the same resource allocation is performed regardless of active BWPs of the UEs.

Next, a method for determining the DCI size for a default mode operation will be described.

The payload size of DCI including group transmit power control (TPC) information received by the UE in a PCell (e.g., DCI format 2-2 and/or DCI format 2-3) may be configured to be the same as the size of fallback DCI (e.g., DCI format 1_0/0_0) that may be transmitted in the common search space of the PCell. In addition, zero-padding and/or truncation may be performed to generate the DCI having the same size as the fallback DCI.

In addition, the payload size of the fallback DCI (DCI format 1_0/0_0) that may be transmitted in the common search space of the PCell may be configured based on the size of the initial DL BWP. For example, the frequency domain resource allocation size of DCI format 1_0 may be configured based on the initial DL BWP, and the size of DCI format 0_0 may be aligned with DCI format 1_0.

The payload size of the fallback DCI (e.g., DCI format 1_0/0_0) transmitted in a UE-specific search space may be changed based on the initial DL BWP rather than an active (DL) BWP in a specific situation. Here, the specific situation may be, for example, a case where the number of DCI sizes for the PDCCH addressed to a C-RNTI exceeds 3 or the total number of DCI sizes exceeds 4. This configuration may limit the budget of DCI sizes and reduce the complexity of the UE.

Similarly, for the PSCell or SCell, the payload size of the DCI may need to be configured based on a specific BWP (e.g., an initial DL BWP for the PCell or SCell) due to the budget of DCI sizes or the like.

In the NR system, in a case where at least the PSCell or the SCell is added and/or handover is performed, updating the initial DL BWP (e.g., BWP #0) through higher layer signaling may be considered. This is because the size of the initial DL BWP having a value other than the size values (e.g., 24/48/96) that the initial DL BWP of the PSCell or SCell may have may be configured when the PSCell or SCell is added and/or handover is performed.

Hereinafter, an example of configuring a payload size of DCI including group TPC received by the UE in an SCell will be described.

Method 1-1:

The payload size for a DCI format for transmitting group TPC (e.g., DCI format 2_2 and DCI format 2_3) may be configured through higher layer signaling. The payload size may be configured through a higher layer only when information about the initial DL BWP may be changed through dedicated RRC signaling. Otherwise, the payload size may be configured based on the size of the initial DL BWP of a serving cell or a PCell in which the DCI including the group TPC is transmitted. For example, the size of the DCI including the group TPC may be configured to be equal to the payload size of the DCI format 1_0/0_0 assuming the size of the initial DL BWP of the serving cell or PCell.

Method 1-2:

The payload size of a DCI format for transmitting group TPC (e.g., DCI format 2_2 or DCI format 2_3) may be configured based on the size of the initial DL BWP of the serving cell in which DCI including group TPC is transmitted. For example, the payload size of the DCI including the group TPC may be configured to be equal to the payload size of DCI format 1_0/0_0 assuming the initial DL BWP of the serving cell in which the DCI including the group TPC is transmitted.

An advantage of Method 1-2 may be that group TPC may be shared with a UE having a corresponding serving cell as a PCeL1. The initial DL BWP of the serving cell may be overridden by an initial DL BWP known by an SIB or UE-dedicated signaling. However, according to Method 1-2, the DCI size may be determined based on the size of the initial DL BWP known through a message for a PBCH, a handover command (or PSCell addition). Thereafter, the DCI size may not change even if the initial DL BWP is overridden.

Specifically, when the initial DL BWP configured for one UE is adapted through one BWP configuration, it may be assumed that the size of the DCI including the corresponding group TPC is determined according to the known initial DL BWP through a message for the PBCH, the handover command, or PSCell addition in an initial access procedure, and then the initial DL BWP will not be overridden by the adapted initial DL BWP.

To this end, when the initial DL BWP is updated through the SIB, a field for updating the initial DL BWP may be transmitted through a separate field from the field for the initial DL BWP indicated by the PBCH. Thereby, the UE may distinguish between the initial DL BWP shared with other UEs indicated on the PBCH and the updated initial DL BWP.

The above-described scheme may be similarly applied to PSCell addition. That is, even if the initial DL BWP is overridden through SIB update or UE-dedicated signaling, DCI format 0_0/1_0 transmitted through the common search space, DCI format 2_1/2-2 including TPC, and/or DCI format 0_0/1_0 transmitted through the UE-specific search space may not affect the case where the size of the DCI is not determined based on the active BWP. That is, even if the size of the initial DL BWP is changed, the size of the DCI may be determined based on the size of the initial DL BWP before the change.

Method 1-3:

The payload size for the DCI format for transmitting group TPC (e.g., DCI format 2_2 or DCI format 2_3) may be configured based on the size of the initial DL BWP of the PCell. For example, the payload size of the DCI including the group TPC may be configured to be equal to the payload size of DCI format 1_0/0_0 assuming the initial DL BWP of the PCell in which the DCI including the group TPC is transmitted.

In this case, the UE may not expect that the PDCCH addressed to the C-RNTI will be transmitted through the common search space for the SCell. Thus, the UE may not unnecessarily increase the DCI size budget. In this case, however, in order to share group TPC, corresponding UEs need to have the same PCell or the same initial DL BWP size for the PCell.

The initial DL BWP may be replaced with a size from the lowest PRB to the highest PRB of a CORESET in which the PDCCH is transmitted. For example, the size of the initial DL BWP may be replaced by (the highest PRB index−the lowest PRB index+1). It may also be replaced by the number of PRBs constituting the CORESET. In this case, the payload size of the DCI including the group TPC may be configured as the payload size of DCI format 1_0/0_0 generated on the assumption that the size derived from the CORESET is the size of the BWP as described above.

Hereinafter, a description will be given of an example of changing the payload size for the fallback DCI received in the UE-specific search space when the DCI size budget is not fulfilled by the UE in the SCell.

Method 2-1:

The payload size of the fallback DCI may be configured to be equal to the payload size for the DCI format for transmitting group TPC received in SCell (e.g., DCI format 2_2 or DCI format 2_3). When the payload size is changed, the size of a specific field such as the frequency domain resource allocation field may be changed. Change of the payload size of the DCI format including the group TPC described above may be limited to a case where the UE receives the DCI including the group TPC in the SCell. In cases other than the case where the DCI including the group TPC is received, it may be assumed or expected that the DCI size budget will be fulfilled for the SCell.

Method 2-2:

The payload size of the fallback DCI received in the UE-specific search space of the SCell may be configured through higher layer signaling. For example, the payload size of the fallback DCI may be configured through a higher layer only when the information about the initial DL BWP is changed through dedicated RRC signaling. Otherwise, the payload size of the fallback DCI may be configured based on the size of the initial DL BWP of the serving cell or PCell.

When the UE receives the fallback DCI in the common search space, the payload size of the fallback DCI may be configured based on the initial DL BWP of the PCell.

In addition, in the NR system, when handover is performed, the BS may change the initial DL BWP of a target serving cell through dedicated signaling. In this case, the initial DL BWP for initial access of the serving cell and PDCCH/PDSCH transmission based thereon need to be maintained.

Specifically, when information about the initial DL BWP for a specific UE is changed, the specific UE may not expect that the PDCCH will correspond to CORESET #0, search space #0, searchSpace-OSI, ra-SearchSpace, and/or paging-SearchSpace of the serving cell in receiving the PDCCH through the changed initial DL BWP of the target serving cell. More specifically, the specific UE may expect that the PDCCH monitoring occasion of the changed initial DL BWP of the target serving cell will not overlap with the PDCCH monitoring occasion of the initial DL BWP of the serving cell. This is intended to assume that, in a CORESET and/or search space corresponding to CORESET #0, search space #0, searchSpace-OSI, ra-SearchSpace, and/or paging-SearchSpace of the serving cell, the specific UE operates based on the initial DL BWP before the initial DL BWP is changed through dedicated signaling.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

Implementations according to the present disclosure may be implemented by various means, for example, hardware, firmware, software or a combination thereof. In the case of hardware implementation, an implementation of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In the case of an implementation by firmware or software, an implementation of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

A method for configuring a reference point irrelevant to a common resource block grid and an apparatus therefor have been described focusing on examples applied to the fifth generation NewRAT system. The method and apparatus are applicable to various systems in addition to the fifth generation NewRAT system.

What is claimed is:

1. A method of receiving a demodulation reference signal (DMRS) by a user equipment (UE) in a wireless communication system, the method comprising:
receiving a physical downlink control channel (PDCCH) through a search space #0 of control resource set (CORESET) #0, wherein the search space #0 is a common search space; and
receiving (i) a physical downlink shared channel (PDSCH) scheduled based on the PDCCH and (ii) a DMRS for the PDSCH,
wherein, based on the PDCCH being addressed to a system information-radio network temporary identifier (SI-RNTI), a reference point for the DMRS is determined to be subcarrier #0 of a lowest-numbered resource block (RB) among RBs included in the CORESET #0, regardless of whether the PDSCH is carrying a system information block 1 (SIB1), and
wherein the CORESET #0 and the search space #0 are configured based on a master information block (MIB) received on a physical broadcast channel (PBCH) included in a synchronization signal (SS)/PBCH block.

2. The method of claim 1, wherein the CORESET #0 is configured for an active downlink bandwidth part (BWP) other than an initial downlink BWP.

3. The method of claim 1, wherein the CORESET #0 is configured for an initial downlink BWP.

4. The method of claim 1, wherein the UE is configured to communicate with at least one of another UE, a network, a base station (B S), or an autonomous vehicle.

5. The method of claim 1, wherein, based on the PDCCH not being addressed to the SI-RNTI, the reference point for the DMRS is determined based on the common search space.

6. An apparatus configured to receive a demodulation reference signal (DMRS) in a wireless communication system, the apparatus comprising:
at least one processor; and
at least one computer memory operably connectable to the at least one processor and storing instructions that, when executed by the at least one processor, perform operations comprising:
receiving a physical downlink control channel (PDCCH) through a search space #0 of control resource set (CORESET) #0, wherein the search space #0 is a common search space, and receiving (i) a physical downlink shared channel (PDSCH) scheduled based on the PDCCH and (ii) a DMRS for the PDSCH,
wherein, based on the PDCCH being addressed to a system information-radio network temporary identifier (SI-RNTI), a reference point for the DMRS is determined to be subcarrier #0 of a lowest-numbered resource block (RB) among RBs included in the CORESET #0, regardless of whether the PDSCH is carrying a system information block 1 (SIB1) and
wherein the CORESET #0 and the search space #0 are configured based on a master information block (MIB) received on a physical broadcast channel (PBCH) included in a synchronization signal (SS)/PBCH block.

7. The apparatus of claim 6, wherein the apparatus is communicable with at least one of a user equipment (UE), a network, a base station (BS), or a self-driving vehicle other than the apparatus.

8. The apparatus of claim 6, wherein, based on the PDCCH not being addressed to the SI-RNTI, the reference point for the DMRS is determined based on the common search space.

9. A user equipment (UE) configured to receive a demodulation reference signal (DMRS) in a wireless communication system, the UE comprising:
at least one transceiver;
at least one processor; and
at least one computer memory operably connectable to the at least one processor and storing instructions that, when executed by the at least one processor, perform operations comprising:
receiving, through the at least one transceiver, a physical downlink control channel (PDCCH) through a search space #0 of control resource set (CORESET) #0, wherein the search space #0 is a common search space, and
receiving, through the at least one transceiver, (i) a physical downlink shared channel (PDSCH) scheduled based on the PDCCH and (ii) a DMRS for the PDSCH,
wherein, based on the PDCCH being addressed to a system information-radio network temporary identifier (SI-RNTI), a reference point for the DMRS is determined to be subcarrier #0 of a lowest-numbered resource block (RB) among RBs included in the CORESET #0, regardless of whether the PDSCH is carrying a system information block 1 (SIB1), and
wherein the CORESET #0 and the search space #0 are configured based on a master information block (MIB) received on a physical broadcast channel (PBCH) included in a synchronization signal (SS)/PBCH block.

10. The UE of claim 9, wherein, based on the PDCCH not being addressed to the SI-RNTI, the reference point for the DMRS is determined based on the common search space.

11. A method of transmitting a demodulation reference signal (DMRS) by a base station (BS) in a wireless communication system, the method comprising:
transmitting a physical downlink control channel (PDCCH) through a search space #0 of control resource set (CORESET) #0, wherein the search space #0 is a common search space; and
transmitting (i) a physical downlink shared channel (PDSCH) scheduled based on the PDCCH and (ii) a DMRS for the PDSCH,
wherein, based on the PDCCH being addressed to a system information-radio network temporary identifier (SI-RNTI), a reference point for the DMRS is determined to be subcarrier #0 of a lowest-numbered resource block (RB) among RBs included in the CORESET #0, regardless of whether the PDSCH is carrying a system information block 1 (SIB1), and
wherein the CORESET #0 and the search space #0 are configured based on a master information block (MIB) transmitted on a physical broadcast channel (PBCH) included in a synchronization signal (SS)/PBCH block.

12. The method of claim 11, wherein the CORESET #0 is configured for an active downlink bandwidth part (BWP) other than an initial downlink BWP.

13. The method of claim 11, wherein the CORESET #0 is configured for an initial downlink BWP.

14. The method of claim 11, wherein, based on the PDCCH not being addressed to the SI-RNTI, the reference point for the DMRS is determined based on the common search space.

15. A base station (BS) configured to transmit a demodulation reference signal (DMRS) in a wireless communication system, the BS comprising:
- at least one transceiver;
- at least one processor; and
- at least one computer memory operably connectable to the at least one processor and storing instructions that, when executed by the at least one processor, perform operations comprising:
- transmitting, through the at least one transceiver, a physical downlink control channel (PDCCH) through a search space #0 of control resource set (CORESET) #0, wherein the search space #0 is a common search space, and
- transmitting, through the at least one transceiver, (i) a physical downlink shared channel (PDSCH) scheduled based on the PDCCH and (ii) a DMRS for the PDSCH,
- wherein, based on the PDCCH being addressed to a system information-radio network temporary identifier (SI-RNTI), a reference point for the DMRS is determined to be subcarrier #0 of a lowest-numbered resource block (RB) among RBs included in the CORESET #0, regardless of whether the PDSCH is carrying a system information block 1 (SIB1), and
- wherein the CORESET #0 and the search space #0 are configured based on a master information block (MIB) transmitted on a physical broadcast channel (PBCH) included in a synchronization signal (SS)/PBCH block.

16. The BS of claim 15, wherein, based on the PDCCH not being addressed to the SI-RNTI, the reference point for the DMRS is determined based on the common search space.

* * * * *